US010956433B2

(12) United States Patent
Singh et al.

(10) Patent No.: US 10,956,433 B2
(45) Date of Patent: Mar. 23, 2021

(54) PERFORMING AN OPERATION RELATIVE TO TABULAR DATA BASED UPON VOICE INPUT

(71) Applicant: Microsoft Corporation, Redmond, WA (US)

(72) Inventors: Prabhdeep Singh, Newcastle, WA (US); Kris Ganjam, Seattle, WA (US); Sumit Gulwani, Bellevue, WA (US); Mark Marron, Bellevue, WA (US); Yun-Cheng Ju, Bellevue, WA (US); Kaushik Chakrabarti, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/283,254

(22) Filed: May 21, 2014

(65) Prior Publication Data
US 2015/0019216 A1    Jan. 15, 2015

Related U.S. Application Data

(60) Provisional application No. 61/846,574, filed on Jul. 15, 2013.

(51) Int. Cl.
*G06F 16/248* (2019.01)
*G06F 16/2457* (2019.01)
(Continued)

(52) U.S. Cl.
CPC ...... *G06F 16/248* (2019.01); *G06F 16/24578* (2019.01); *G06F 40/18* (2020.01); *G10L 15/183* (2013.01); *G10L 2015/228* (2013.01)

(58) Field of Classification Search
None
See application file for complete search history.

(56) References Cited

U.S. PATENT DOCUMENTS

| 5,701,469 A | 12/1997 | Brandli et al. | |
| 5,926,822 A * | 7/1999 | Garman | G06F 40/18 |
| | | | 715/201 |

(Continued)

FOREIGN PATENT DOCUMENTS

| CN | 101258496 A | 9/2008 |
| CN | 103081004 A | 5/2013 |

(Continued)

OTHER PUBLICATIONS

"Voice Recognition With Software Applications Script to Construct an Excel 2000 Worksheet Using Dragon NaturallySpeaking 5.0" Webpage archive Feb. 21, 2005.*

(Continued)

*Primary Examiner* — Fariba Sirjani
(74) *Attorney, Agent, or Firm* — Medley, Behrens & Lewis, LLC

(57) ABSTRACT

Described herein are various technologies pertaining to performing an operation relative to tabular data based upon voice input. An ASR system includes a language model that is customized based upon content of the tabular data. The ASR system receives a voice signal that is representative of speech of a user. The ASR system creates a transcription of the voice signal based upon the ASR being customized with the content of the tabular data. The operation relative to the tabular data is performed based upon the transcription of the voice signal.

20 Claims, 25 Drawing Sheets

(51) Int. Cl.
  *G10L 15/183* (2013.01)
  *G06F 40/18* (2020.01)
  *G10L 15/22* (2006.01)

(56) References Cited

U.S. PATENT DOCUMENTS

| | | | |
|---|---|---|---|
| 5,950,167 A * | 9/1999 | Yaker | H04M 1/271 |
| | | | 704/275 |
| 6,125,347 A * | 9/2000 | Cote | G10L 15/26 |
| | | | 704/270 |
| 6,134,563 A * | 10/2000 | Clancey | G06F 40/183 |
| | | | 715/210 |
| 6,513,037 B1 | 1/2003 | Ruber et al. | |
| 6,816,837 B1 * | 11/2004 | Davis | G10L 15/26 |
| | | | 704/275 |
| 6,832,196 B2 | 12/2004 | Reich | |
| H002189 H * | 5/2007 | Rao | G06F 16/685 |
| | | | 704/270.1 |
| 7,350,187 B1 | 3/2008 | Tong et al. | |
| 7,613,676 B2 * | 11/2009 | Baisley | G06Q 10/10 |
| | | | 706/57 |
| 7,613,719 B2 * | 11/2009 | Chang | G06F 16/243 |
| 7,730,060 B2 | 6/2010 | Chakrabarti et al. | |
| 8,015,172 B1 | 9/2011 | Cave et al. | |
| 8,260,809 B2 | 9/2012 | Platt et al. | |
| 8,380,505 B2 | 2/2013 | Konig et al. | |
| 8,812,298 B1 * | 8/2014 | Wolfram | G06F 16/3329 |
| | | | 704/9 |
| 8,886,540 B2 * | 11/2014 | Cerra | G10L 15/183 |
| | | | 379/142.14 |
| 2003/0033287 A1 | 2/2003 | Shanahan et al. | |
| 2003/0033288 A1 | 2/2003 | Shanahan et al. | |
| 2003/0110040 A1 * | 6/2003 | Holland | G10L 15/26 |
| | | | 704/275 |
| 2003/0120493 A1 * | 6/2003 | Gupta | G10L 15/063 |
| | | | 704/270.1 |
| 2003/0167266 A1 | 9/2003 | Saldanha et al. | |
| 2004/0010410 A1 | 1/2004 | Oh et al. | |
| 2005/0050042 A1 * | 3/2005 | Elder | G06F 17/3043 |
| 2007/0011297 A1 | 1/2007 | Boylan et al. | |
| 2007/0038449 A1 * | 2/2007 | Coifman | G10L 15/065 |
| | | | 704/243 |
| 2007/0055556 A1 * | 3/2007 | Frank-Backman | G06F 40/18 |
| | | | 715/212 |
| 2007/0078679 A1 * | 4/2007 | Rose | G16H 10/60 |
| | | | 705/2 |
| 2007/0217701 A1 | 9/2007 | Liu et al. | |
| 2007/0219956 A1 | 9/2007 | Milton | |
| 2007/0220415 A1 | 9/2007 | Cheng et al. | |
| 2008/0016041 A1 | 1/2008 | Frost et al. | |
| 2008/0154611 A1 | 6/2008 | Evermann et al. | |
| 2009/0313026 A1 * | 12/2009 | Coffman | H04M 3/4938 |
| | | | 704/275 |
| 2009/0319542 A1 | 12/2009 | Le brazidec et al. | |
| 2011/0302553 A1 * | 12/2011 | Gulwani | G06F 9/44 |
| | | | 717/107 |
| 2012/0059655 A1 | 3/2012 | Cartales | |
| 2012/0078888 A1 * | 3/2012 | Brown | G06F 16/24578 |
| | | | 707/723 |
| 2012/0185787 A1 | 7/2012 | Lisse et al. | |
| 2012/0197864 A1 * | 8/2012 | Bourdoncle | G06F 16/31 |
| | | | 707/711 |
| 2013/0031089 A1 | 1/2013 | Allen et al. | |
| 2013/0124194 A1 | 5/2013 | Nadal | |
| 2013/0173639 A1 | 7/2013 | Chandra et al. | |
| 2013/0238621 A1 | 9/2013 | Ganjam et al. | |
| 2014/0032467 A1 * | 1/2014 | Reddy | G06N 20/00 |
| | | | 706/46 |
| 2014/0052480 A1 * | 2/2014 | Bell | G06Q 40/08 |
| | | | 705/4 |
| 2014/0214399 A1 * | 7/2014 | Gulwani | G06F 40/18 |
| | | | 704/8 |
| 2014/0337329 A1 * | 11/2014 | Brown | G06F 16/3329 |
| | | | 707/723 |
| 2014/0358964 A1 * | 12/2014 | Woods | G06F 16/3329 |
| | | | 707/769 |
| 2015/0019216 A1 * | 1/2015 | Singh | G06F 16/24578 |
| | | | 704/235 |
| 2015/0019540 A1 | 1/2015 | Ganjam et al. | |
| 2015/0363478 A1 | 12/2015 | Haynes | |
| 2016/0232329 A1 * | 8/2016 | Xu | G06F 40/186 |
| 2016/0358603 A1 * | 12/2016 | Azam | G10L 15/22 |

FOREIGN PATENT DOCUMENTS

| | | |
|---|---|---|
| EP | 1238348 A2 | 9/2002 |
| EP | 2575128 A2 | 4/2013 |
| JP | 2001319046 A | 11/2001 |
| JP | 2005242995 A | 9/2005 |
| KR | 1020010095401 A | 11/2001 |
| KR | 1020120057786 A | 6/2012 |
| RU | 2273879 C2 | 4/2006 |
| RU | 2013150524 A | 5/2015 |
| RU | 2683507 C2 | 3/2019 |
| WO | 9809228 A1 | 3/1998 |
| WO | 9914743 A1 | 3/1999 |
| WO | 0106397 A2 | 1/2001 |
| WO | 0229627 A2 | 4/2002 |
| WO | 0246956 A2 | 6/2002 |
| WO | 02046956 A3 | 6/2002 |

OTHER PUBLICATIONS

"Voice Recognition with Software Applications Script to Construct an Excal 2000 Worksheet Using Dragon NaturallySpeaking 5.0", Feb. 21, 2005 archive.*

"About speech recognition in Excel", https://support.microsoft.com/en-us/kb/288979, Microsoft Jan. 21, 2007.*

"Voice Recognition Technology for Spreadsheet Navigation and Information Retrieval", Published on: Dec. 6, 2013, Retrieved at: <<http://eprints.dkit.ie/118/1/FloodMcDaidMcCafferyIT2009.pdf>>, 8 pages.

"Dragon Naturallyspeaking Feature Matrix", Published on: Dec. 2, 2013, Retrieved at: <<http://www.nuance.com/ucmprod/groups/dragon/@web-enus/documents/collateral/nc_016429.pdf>>, 4 pages.

Doush, et al., "Non-Visual Navigation of Spreadsheets Enhancing Accessibility of Microsoft ExcelTM", In Journal of Universal Access in the Information Society, vol. 12, Issue 2, Jun. 2013, 22 pages.

Flood, et al., "Voice-Controlled Debugging of Spreadsheet", In Proceedings of the European Spreadsheet Risks Interest Group, Feb. 24, 2008, 10 pages.

Flood, et al., "Intelligent Voice Navigation of Spreadsheets: An Empirical Evaluation", In Proceedings of 11th International Conference on Text, Speech and Dialogue, Sep. 8, 2008, 8 pages.

Rudnicky, Alexander I., "The Design of Voice-Driven Interfaces", In Proceedings of the workshop on Speech and Natural Language, Feb. 21, 1989, 5 pages.

"International Preliminary Report on Patentability Issued in PCT Application No. PCT/US2014/046457", dated Dec. 8, 2015, 6 Pages.

"International Search Report & Written Opinion Issued in PCT Application No. PCT/US2014/046457", dated Apr. 28, 2015, 10 Pages.

"Second Written Opinion Issued in PCT Application No. PCT/US2014/046457", dated Sep. 10, 2015, 5 Pages.

"Response to the Official Communication Under R. 161(1) and 162 EPC for European Patent Application No. 14745319.5", Filed Date: Mar. 29, 2016, 19 Pages.

"Response to the International Search Report (ISR) and Written Opinion for PCT Patent Application No. PCT/US2014/046457", Filed Date: Jul. 28, 2015, 3 pages.

"Office Action and Search Report Issued in Chinese Application No. 201480040338.8", dated Apr. 19, 2017, 22 Pages.

"Second Office Action Issued in Chinese Patent Application No. 201480040338.8", dated Jan. 17, 2018, 16 Pages.

(56) References Cited

OTHER PUBLICATIONS

"DashScribe VoiceForms,The Best Way to Gather Data by Voice", Retrieved From: https://web.archive.org/web/20130522192115/https://www.dashscribe.com/, May 22, 2013, 4 Pages.

Allauzen, et al., "Voice Query Refinement", In Proceedings of 13th Annual Conference of the International Speech Communication Association, Sep. 9, 2012, 4 Pages.

"Final Office Action Issued in U.S. Appl. No. 14/283,273", dated Oct. 18, 2017, 14 Pages.

"Non Final Office Action Issued in U.S. Appl. No. 14/283,273", dated Jan. 20, 2017, 14 Pages.

"Non Final Office Action Issued in U.S. Appl. No. 14/283,273", dated Jun. 13, 2018, 20 Pages.

"Office Action Issued in Colombian Patent Application No. 168426", dated Dec. 18, 2018, 10 Pages.

"Office Action Issued in Columbian Patent Application No. 168426", dated Feb. 16, 2016, 4 Pages. W/O English Translation.

"Third Office Action Issued in Chinese Patent Application No. 201480040338.8", dated Aug. 15, 2018, 12 Pages.

"First Office Action and Search Report Issued in Chinese Patent Application No. 201480040374.4", dated May 19, 2017, 15 pages.

"Second Office Action Issued in Chinese Patent Application No. 201480040374.4", dated Feb. 26, 2018, 12 Pages.

"Office action Issued in Russian Patent Application No. 2016100989", dated May 17, 2018, 7 Pages. W/O English Translation.

"Office action Issued in Japanese Patent Application No. 2016-527001", dated May 29, 2018, 7 Pages.

"Office Action Issued in Israel Patent Application No. 243379", dated Jul. 17, 2018, 6 Pages.

"Office Action Issued in Israel Patent Application No. 243379", dated Jan. 7, 2018, 2 Pages. W/O English Translation.

"Office Action Issued in Chile Patent Application No. 74-2016", dated Jan. 24, 2018, 6 Pages.

"Office Action Issued in Chile Patent Application No. 74-2016", dated Jul. 14, 2017, 6 Pages.

Chitu, Alex, "Table Snippets in Google Search", Retrieved From: http://googlesystem.blogspot.nl/2011/11/table-snippets-in-google-search.html, Nov. 17, 2011, 2 Pages.

Flood, et al., "NLP-SIR: A Natural Language Approach for Spreadsheet Information Retrieval", In Journal of Computing Research Repository, Aug. 8, 2009, 12 Pages.

Heddings, Lowell, "How to Use AutoFill on a Google Docs Spreadsheet", Retrieved From: http://www.howtogeek.com/howto/15799/how-to-use-autofill-on-a-google-docs-spreadsheet-quick-tips/, Apr. 28, 2010, 6 Pages.

"Office Action Issued in Mexican Patent Application No. MX/a/2016/000687", dated Mar. 5, 2018, 6 Pages.

"Office Action Issued in Mexico Patent Application No. MX/a/2016/000687", dated Jun. 29, 2017, 4 Pages.

"International Preliminary Report on Patentability Issued in PCT Application No. PCT/US2014/046458", dated Dec. 21, 2015, 6 Pages.

"International Search Report and Written Opinion Issued in PCT Application No. PCT/US2014/046458", dated Apr. 29, 2015, 10 Pages.

"Second Written Opinion Issued in PCT Application No. PCT/US2014/046458", dated Oct. 21, 2015, 5 Pages.

"Final Office Action Issued in U.S. Appl. No. 14/283,273", dated Mar. 7, 2019, 13 Pages.

"Office Action Issued in Australian Patent Application No. 2014290354", dated Mar. 4, 2019, 3 Pages.

"Office Action Issued in Chinese Patent Application No. 201480040338.8", dated Feb. 19, 2019, 11 Pages.

"Office Action Issued in Chinese Patent Application No. 201480040374.4", dated Sep. 29, 2018, 9 Pages.

"Office Action Issued in Mexican Application No. MX/a/2016/000687", dated Nov. 16, 2018, 8 Pages.

"Office Action Issued in Indonesian Patent Application No. P00201600224", dated Jan. 30, 2019, 3 Pages.

"Third Office Action Issued in Chinese Patent Application No. 201480040374.4", dated Jun. 18, 2019, 16 Pages.

"Notice of Allowance Issued in Australian Patent Application No. 2014290354", dated Jul. 17, 2019, 3 Pages.

"Office Action Issued in Indonesian Patent Application No. P00201600224", dated Jul. 11, 2019, 3 Pages.

"Office Action Issued in European Patent Application No. 14745319.5", dated Sep. 27, 2019, 6 Pages.

"Office Action Issued in European Patent Application No. 14745320.3", dated Sep. 17, 2019, 6 Pages.

"Office Action Issued in Philippines Patent Application No. 1-2016-500048", dated Oct. 18, 2019, 5 Pages.

"Office Action Issued in Mexican Patent Application No. MX/a/2016/000687", dated Aug. 1, 2019, 8 Pages.

"Office Action Issued in New Zealand Patent Application No. 715987", dated Jan. 20, 2020, 3 Pages.

"Office Action Issued in Malaysia Patent Application No. PI 2016700139", dated Jan. 31, 2020, 4 Pages.

"Fourth Office Action Issued in Chinese Patent Application No. 201480040374.4", dated Mar. 9, 2020, 10 Pages.

"Office Action Issued in Brazilian Patent Application No. BR112016000692-5", dated Feb. 18, 2020, 5 Pages.

"Office Action Issued in Indian Patent Application No. 201647000644", dated May 14, 2020, 9 Pages.

"Office Action Issued in Philippines Patent Application No. 1-2016-500048", dated May 28, 2020, 5 Pages.

"Office Action Issued in Chinese Patent Application No. 201480040338.8", dated Jun. 16, 2020, 10 Pages.

"Office Action Issued in Indian Patent Application No. 201647000833", dated Jun. 25, 2020; 7 Pages.

Lenssen, Philipp, "Google Spreadsheets Adds Import Functions, Auto-Fill", Retrieved from: http://blogoscoped.com/archive/2007-09-06-n41.html, Sep. 6, 2007, 2 Pages.

Chitu, Alex, "Table Snippets in Google Search", Retrieved from: http://googlesystem.blogspot.com/2011/11/table-snippets-in-google-search.html, Nov. 17, 2011, 1 Page.

"Office Action Issued in Korean Patent Application No. 10-2016-7001063", dated Aug. 12, 2020, 17 Pages.

"Office Action Issued in Korean Patent Application No. 10-2016-7001093", dated Aug. 27, 2020, 19 Pages.

* cited by examiner

FIG. 10

|    | A | B | C | D | E | F |
|----|---|---|---|---|---|---|
|    | TOOLBAR | | | | 804 | |
| 1  | COMPANY | RANK | PC COUNT | OFFICE SEATS | EMPLOYEES | |
| 2  | COMPANY 1 | RANK 1 | PC COUNT 1 | OFFICE SEATS 1 | EMPLOYEES 1 | |
| 3  | COMPANY 2 | RANK 2 | PC COUNT 2 | OFFICE SEATS 2 | EMPLOYEES 2 | |
| 4  | COMPANY 3 | RANK 3 | PC COUNT 3 | OFFICE SEATS 3 | EMPLOYEES 3 | |
| 5  | COMPANY 4 | RANK 4 | PC COUNT 4 | OFFICE SEATS 4 | EMPLOYEES 4 | 802 |
| 6  | COMPANY 5 | RANK 5 | PC COUNT 5 | OFFICE SEATS 5 | EMPLOYEES 5 | |
| 7  | COMPANY 6 | RANK 6 | PC COUNT 6 | OFFICE SEATS 6 | EMPLOYEES 6 | |
| 8  | COMPANY 7 | RANK 7 | PC COUNT 7 | OFFICE SEATS 7 | EMPLOYEES 7 | |
| 9  | COMPANY 8 | RANK 8 | PC COUNT 8 | OFFICE SEATS 8 | EMPLOYEES 8 | |
| 10 | COMPANY 9 | RANK 9 | PC COUNT 9 | OFFICE SEATS 9 | EMPLOYEES 9 | |
| 11 | COMPANY 10 | RANK 10 | PC COUNT 10 | OFFICE SEATS 10 | EMPLOYEES 10 | |
| 12 | COMPANY 11 | RANK 11 | PC COUNT 11 | OFFICE SEATS 11 | EMPLOYEES 11 | |
| 13 | COMPANY 12 | RANK 12 | PC COUNT 12 | OFFICE SEATS 12 | EMPLOYEES 12 | |

TABLE 1  NEW  GO  RESET

806 QUERY FIELD

HOW MANY EMPLOYEES DOES EACH COMPANY HAVE? 1002

SPEAK 814

812

1004 IMPORTED DATA FROM SOURCE 1

| | A | B | C | D | E | F |
|---|---|---|---|---|---|---|
| | | | TOOLBAR | | 804 | |
| 1 | COMPANY | RANK | PC COUNT | OFFICE SEATS | EMPLOYEES | |
| 2 | COMPANY 1 | RANK 1 | PC COUNT 1 | OFFICE SEATS 1 | EMPLOYEES 1 | |
| 3 | COMPANY 2 | RANK 2 | PC COUNT 2 | OFFICE SEATS 2 | EMPLOYEES 2 | |
| 4 | COMPANY 3 | RANK 3 | PC COUNT 3 | OFFICE SEATS 3 | EMPLOYEES 3 | |
| 5 | COMPANY 4 | RANK 4 | PC COUNT 4 | OFFICE SEATS 4 | EMPLOYEES 4 | 802 |
| 6 | COMPANY 5 | RANK 5 | PC COUNT 5 | OFFICE SEATS 5 | EMPLOYEES 5 | |
| 7 | COMPANY 6 | RANK 6 | PC COUNT 6 | OFFICE SEATS 6 | EMPLOYEES 6 | |
| 8 | COMPANY 7 | RANK 7 | PC COUNT 7 | OFFICE SEATS 7 | EMPLOYEES 7 | |
| 9 | COMPANY 8 | RANK 8 | PC COUNT 8 | OFFICE SEATS 8 | EMPLOYEES 8 | |
| 10 | COMPANY 9 | RANK 9 | PC COUNT 9 | OFFICE SEATS 9 | EMPLOYEES 9 | |
| 11 | COMPANY 10 | RANK 10 | PC COUNT 10 | OFFICE SEATS 10 | EMPLOYEES 10 | |
| 12 | COMPANY 11 | RANK 11 | PC COUNT 11 | OFFICE SEATS 11 | EMPLOYEES 11 | |
| 13 | COMPANY 12 | RANK 12 | PC COUNT 12 | OFFICE SEATS 12 | EMPLOYEES 12 | |

TABLE 1 | NEW

GO | RESET

QUERY FIELD 812

806

1102 — SHOW ME COMPANIES THAT HAVE 25% MORE EMPLOYEES THAN OFFICE SEATS

SPEAK 814

| | A | B | C | D | E | F |
|---|---|---|---|---|---|---|
| | TOOLBAR | | | | 804 | |
| | COMPANY | RANK | PC COUNT | OFFICE SEATS | EMPLOYEES | |
| 1 | COMPANY 1 | RANK 1 | PC COUNT 1 | OFFICE SEATS 1 | EMPLOYEES 1 | |
| 2 | COMPANY 10 | RANK 10 | PC COUNT 10 | OFFICE SEATS 10 | EMPLOYEES 10 | |
| 3 | COMPANY 12 | RANK 12 | PC COUNT 12 | OFFICE SEATS 12 | EMPLOYEES 12 | |
| 4 | COMPANY 15 | RANK 15 | PC COUNT 15 | OFFICE SEATS 15 | EMPLOYEES 15 | 802 |
| 5 | COMPANY 19 | RANK 19 | PC COUNT 19 | OFFICE SEATS 19 | EMPLOYEES 19 | |
| 6 | COMPANY 20 | RANK 20 | PC COUNT 20 | OFFICE SEATS 20 | EMPLOYEES 20 | |
| 7 | COMPANY 21 | RANK 21 | PC COUNT 21 | OFFICE SEATS 21 | EMPLOYEES 21 | |
| 8 | COMPANY 23 | RANK 23 | PC COUNT 23 | OFFICE SEATS 23 | EMPLOYEES 23 | |
| 9 | COMPANY 27 | RANK 27 | PC COUNT 27 | OFFICE SEATS 27 | EMPLOYEES 27 | |
| 10 | COMPANY 29 | RANK 29 | PC COUNT 29 | OFFICE SEATS 29 | EMPLOYEES 29 | |
| 11 | COMPANY 30 | RANK 30 | PC COUNT 30 | OFFICE SEATS 30 | EMPLOYEES 30 | |
| 12 | COMPANY 33 | RANK 33 | PC COUNT 33 | OFFICE SEATS 33 | EMPLOYEES 33 | |
| 13 | TABLE 1 | TABLE 2 | NEW | | | |

806 QUERY FIELD [GO] [RESET]

SETTING FILTER: EMPLOYEES > (OFFICE SEATS * 1.25) — 1202

DISPLAYING NEW TABLE — 1204

812  SPEAK 814

FIG. 13

| | A | B | C | D | E | F |
|---|---|---|---|---|---|---|
| | \<- 1300 | | TOOLBAR | | | |
| 1 | INDUSTRY | PROFIT | | | | |
| 2 | INDUSTRY 1 | PROFIT 1 | | | | |
| 3 | INDUSTRY 2 | PROFIT 2 | | | | |
| 4 | INDUSTRY 3 | PROFIT 3 | | | | 802 |
| 5 | INDUSTRY 4 | PROFIT 4 | | | | |
| 6 | INDUSTRY 5 | PROFIT 5 | | | | |
| 7 | INDUSTRY 6 | PROFIT 6 | | | | |
| 8 | INDUSTRY 7 | PROFIT 7 | | | | |
| 9 | INDUSTRY 8 | PROFIT 8 | | | | |
| 10 | INDUSTRY 9 | PROFIT 9 | | | | |
| 11 | INDUSTRY 10 | PROFIT 10 | | | | |
| 12 | INDUSTRY 11 | PROFIT 11 | | | | |
| 13 | INDUSTRY 12 | PROFIT 12 | | | | |

804

TABLE 1 | TABLE 2 | TABLE 3 | NEW

QUERY FIELD  GO  RESET  SHOW ME THE INDUSTRIES THAT ARE MOST PROFITABLE — 1302

806  812  SPEAK 814

FIG. 14

| | A | B | C | D | E | F | |
|---|---|---|---|---|---|---|---|
| | | | TOOLBAR | | | | |
| 1 | INDUSTRY | PROFIT | | | | | |
| 2 | INDUSTRY 1 | PROFIT 1 | | | | | |
| 3 | INDUSTRY 2 | PROFIT 2 | | | | | |
| 4 | INDUSTRY 3 | PROFIT 3 | | | | 802 | |
| 5 | INDUSTRY 4 | PROFIT 4 | | | | | |
| 6 | INDUSTRY 5 | PROFIT 5 | | | | | |
| 7 | INDUSTRY 6 | PROFIT 6 | | | | | |
| 8 | INDUSTRY 7 | PROFIT 7 | | | | | |
| 9 | INDUSTRY 8 | PROFIT 8 | | | | | |
| 10 | INDUSTRY 9 | PROFIT 9 | | | | | |
| 11 | INDUSTRY 10 | PROFIT 10 | | | | | |
| 12 | INDUSTRY 11 | PROFIT 11 | | | | | |
| 13 | INDUSTRY 12 | PROFIT 12 | | | | | |

TABLE 1 | TABLE 2 | TABLE 3 | NEW

806 QUERY FIELD | GO 1402 | RESET

IMPORTED PROFIT $M FROM SOURCE 2 — 1404

CREATE PIVOT TABLE: SUM PROFIT ($M) BY INDUSTRY

812   SPEAK 814

| | A | B | C | D | E | F |
|---|---|---|---|---|---|---|
| | \<-- 1500 | | TOOLBAR | | | |
| 1 | INDUSTRY | PROFIT | | | | |
| 2 | INDUSTRY 1 | PROFIT 1 | | | | |
| 3 | INDUSTRY 2 | PROFIT 2 | | | | |
| 4 | INDUSTRY 3 | PROFIT 3 | | | | 802 |
| 5 | INDUSTRY 4 | PROFIT 4 | | | | |
| 6 | INDUSTRY 5 | PROFIT 5 | | | | |
| 7 | INDUSTRY 6 | PROFIT 6 | | | 804 | |
| 8 | INDUSTRY 7 | PROFIT 7 | | | | |
| 9 | INDUSTRY 8 | PROFIT 8 | | | | |
| 10 | INDUSTRY 9 | PROFIT 9 | | | | |
| 11 | INDUSTRY 10 | PROFIT 10 | | | | |
| 12 | INDUSTRY 11 | PROFIT 11 | | | | |
| 13 | INDUSTRY 12 | PROFIT 12 | | | | |

TABLE 1 | TABLE 2 | TABLE 3 | NEW

QUERY FIELD — GO | RESET

806 — SORTING DATA BY PROFIT — 1402

812

SPEAK 814

FIG. 18

| | A | B | C | D | E | F |
|---|---|---|---|---|---|---|
| | | | TOOLBAR | | | |
| 1 | INDUSTRY | SPEND | | | | |
| 2 | INDUSTRY 1 | SPEND 1 | | | | |
| 3 | INDUSTRY 2 | SPEND 2 | | | | |
| 4 | INDUSTRY 3 | SPEND 3 | | | | |
| 5 | INDUSTRY 4 | SPEND 4 | | | | 802 |
| 6 | INDUSTRY 5 | SPEND 5 | | | | |
| 7 | INDUSTRY 6 | SPEND 6 | | | | |
| 8 | INDUSTRY 7 | SPEND 7 | | | | |
| 9 | INDUSTRY 8 | SPEND 8 | | | | |
| 10 | INDUSTRY 9 | SPEND 9 | | | | |
| 11 | INDUSTRY 10 | SPEND 10 | | | | |
| 12 | INDUSTRY 11 | SPEND 11 | | | | |
| 13 | INDUSTRY 12 | SPEND 12 | | | | |

804

1800

TABLE 1 | TABLE 2 | TABLE 3 | TABLE 4 | NEW

806 QUERY FIELD    GO   RESET — 1802

CREATING PIVOT TABLE: SUM SPEND BY INDUSTRY

— 1804

SORTING TABLE BY SPEND

812

◁ ▷ SPEAK 814

TOOLBAR

| | A | B | C | D | E | F | G | H |
|---|---|---|---|---|---|---|---|---|
| | COMPANY | RANK | PC COUNT | OFFICE SEATS | EMPLOYEES | INDUSTRY | SPEND | |
| 1 | | | | | | | | |
| 2 | COMPANY 1 | RANK 1 | PC COUNT 1 | OFFICE SEATS 1 | EMPLOYEES 1 | INDUSTRY 1 | SPEND 1 | |
| 3 | COMPANY 2 | RANK 2 | PC COUNT 2 | OFFICE SEATS 2 | EMPLOYEES 2 | INDUSTRY 1 | SPEND 2 | |
| 4 | COMPANY 3 | RANK 3 | PC COUNT 3 | OFFICE SEATS 3 | EMPLOYEES 3 | INDUSTRY 1 | SPEND 3 | |
| 5 | COMPANY 4 | RANK 4 | PC COUNT 4 | OFFICE SEATS 4 | EMPLOYEES 4 | INDUSTRY 1 | SPEND 4 | 802 |
| 6 | COMPANY 5 | RANK 5 | PC COUNT 5 | OFFICE SEATS 5 | EMPLOYEES 5 | INDUSTRY 1 | SPEND 5 | |
| 7 | COMPANY 6 | RANK 6 | PC COUNT 6 | OFFICE SEATS 6 | EMPLOYEES 6 | INDUSTRY 1 | SPEND 6 | |
| 8 | COMPANY 7 | RANK 7 | PC COUNT 7 | OFFICE SEATS 7 | EMPLOYEES 7 | INDUSTRY 1 | SPEND 7 | |
| 9 | COMPANY 8 | RANK 8 | PC COUNT 8 | OFFICE SEATS 8 | EMPLOYEES 8 | INDUSTRY 1 | SPEND 8 | |
| 10 | COMPANY 9 | RANK 9 | PC COUNT 9 | OFFICE SEATS 9 | EMPLOYEES 9 | INDUSTRY 1 | SPEND 9 | |
| 11 | COMPANY 10 | RANK 10 | PC COUNT 10 | OFFICE SEATS 10 | EMPLOYEES 10 | INDUSTRY 1 | SPEND 10 | |
| 12 | COMPANY 11 | RANK 11 | PC COUNT 11 | OFFICE SEATS 11 | EMPLOYEES 11 | INDUSTRY 1 | SPEND 11 | |
| 13 | COMPANY 12 | RANK 12 | PC COUNT 12 | OFFICE SEATS 12 | EMPLOYEES 12 | INDUSTRY 1 | SPEND 12 | |

804

TABLE 2 | TABLE 3 | TABLE 4 | TABLE 5 | NEW

806 QUERY FIELD | GO | RESET

SETTING FILTER: INDUSTRY=OIL GAS, MINING — 2002
DISPLAYING NEW TABLE — 2004
SORTING TABLE BY SPEND — 2006

812

SPEAK 814

FIG. 23

| | F | G | H | I | J | K | L | M |
|---|---|---|---|---|---|---|---|---|
| 1 | INDUSTRY | SPEND | CONTACTNAME | PHONE | EMAIL | COMMISSION | | |
| 2 | COMPANY 1 | RANK 1 | CONTACTNAME 1 | PHONE 1 | EMAIL 1 | COMMISSION 1 | | |
| 3 | COMPANY 2 | RANK 2 | CONTACTNAME 2 | PHONE 2 | EMAIL 2 | COMMISSION 2 | | |
| 4 | COMPANY 3 | RANK 3 | CONTACTNAME 3 | PHONE 3 | EMAIL 3 | COMMISSION 3 | | |
| 5 | COMPANY 4 | RANK 4 | CONTACTNAME 4 | PHONE 4 | EMAIL 4 | COMMISSION 4 | | 802 |
| 6 | COMPANY 5 | RANK 5 | CONTACTNAME 5 | PHONE 5 | EMAIL 5 | COMMISSION 5 | | |
| 7 | COMPANY 6 | RANK 6 | CONTACTNAME 6 | PHONE 6 | EMAIL 6 | COMMISSION 6 | | |
| 8 | COMPANY 7 | RANK 7 | CONTACTNAME 7 | PHONE 7 | EMAIL 7 | COMMISSION 7 | | |
| 9 | COMPANY 8 | RANK 8 | CONTACTNAME 8 | PHONE 8 | EMAIL 8 | COMMISSION 8 | | |
| 10 | COMPANY 9 | RANK 9 | CONTACTNAME 9 | PHONE 9 | EMAIL 9 | COMMISSION 9 | | |
| 11 | COMPANY 10 | RANK 10 | CONTACTNAME 10 | PHONE 10 | EMAIL 10 | COMMISSION 10 | | |
| 12 | COMPANY 11 | RANK 11 | CONTACTNAME 11 | PHONE 11 | EMAIL 11 | COMMISSION 11 | | |
| 13 | COMPANY 12 | RANK 12 | CONTACTNAME 12 | PHONE 12 | EMAIL 12 | COMMISSION 12 | | |

TABLE 2 | TABLE 3 | TABLE 4 | TABLE 5 | NEW

QUERY FIELD | GO | RESET

IMPORT COMMISSION FROM SOURCE 5

SPEAK

FIG. 24

AFRICAN COUNTRIES GDP — 2402

SUBMIT

URL — 2406

2400

2404

| TOTAL GDP | NATION | GDP BY AGRICULTURE | GDP BY INDUSTRY |
|---|---|---|---|
| GDP 1 | NATION 1 | GDP BY AGRICULTURE 1 | GDP BY INDUSTRY 1 |
| GDP 2 | NATION 1 | GDP BY AGRICULTURE 2 | GDP BY INDUSTRY 2 |
| GDP 3 | NATION 1 | GDP BY AGRICULTURE 3 | GDP BY INDUSTRY 3 |
| GDP 4 | NATION 1 | GDP BY AGRICULTURE 4 | GDP BY INDUSTRY 4 |
| GDP 5 |  | GDP BY AGRICULTURE 5 | GDP BY INDUSTRY 5 |

PERFORMING AN OPERATION RELATIVE TO TABULAR DATA BASED UPON VOICE INPUT

RELATED APPLICATION

This application claims priority to U.S. Provisional Patent Application No. 61/846,574, filed on Jul. 15, 2013, and entitled "TABLE RETRIEVAL AND MANIPULATION BASED UPON NATURAL LANGUAGE QUERIES", the entirety of which is incorporated herein by reference.

BACKGROUND

Computer-executable spreadsheet applications are conventionally configured to allow users thereof to organize and analyze tabular data. Generally, a spreadsheet of a computer-executable spreadsheet application includes cells that are arranged in rows and columns. The cells can include respective text strings, wherein a text string can be or include a numerical value, a textual character, a symbol, or some combination thereof. Furthermore, a function can be assigned to a cell, such that a value of the cell is determined based upon values of other cells in the spreadsheet. A user of the spreadsheet application can select a cell and manually modify its content, for example, by altering characters in the cell or modifying the function assigned to the cell.

A conventional spreadsheet application is well-suited for organizing and manipulating tabular data, particularly if the user of the spreadsheet application is familiar with functions that are natively supported by the spreadsheet application and commands that invoke such functions. In an example, the user of the spreadsheet application can cause values in several cells to be summed, with the resultant summation shown in a particular cell, by selecting the cell, setting forth a textual command in a text entry field (e.g., "SUM"), and selecting the several cells (e.g., by way of a graphical user interface or a text entry).

While novice users can generally learn basic functions supported by the spreadsheet application relatively quickly, novice users often find more complex or nuanced manipulation of tabular data difficult to perform. Further, it is often difficult for a user to remember or know the proper syntax for different spreadsheet environments (even when the user is an expert), as the different spreadsheet environments have their own respective nuances. For example, a novice user of the conventional spreadsheet application may have difficulty performing certain types of sort operations over tabular data loaded in the spreadsheet application. In another example, the novice user may have difficulty creating a sequence of commands supported by the spreadsheet application to re-organize tabular data. In some situations, for example, a novice user will undertake the arduous task of manually copying cell values and placing them in desired positions rather than constructing a macro that can perform the reorganization automatically.

Furthermore, some types of spreadsheet-related operations can be difficult on mobile computing devices, due to the relatively small display real estate on these devices. To overcome problems associated with smaller displays, users can enlarge views on the display, providing a "zoomed in" view of a portion of the spreadsheet. This, however, can prevent the user from obtaining a more global view of the tabular data, potentially negatively impacting the experience of the user with the spreadsheet application.

SUMMARY

The following is a brief summary of subject matter that is described in greater detail herein. This summary is not intended to be limiting as to the scope of the claims.

Described herein are various technologies that facilitate manipulation of tabular data by way of speech input. For example, an application can be configured to display tabular data, such as a word processing application, a spreadsheet application, a web browser, or the like. The application may have tabular data loaded therein, wherein the tabular data can include values that are not commonly utilized in a particular language, values that are customized by the user (e.g., names of people, acronyms defined by the user, etc.). The application may further include or be in communication with an automatic speech recognition (ASR) system that is configured to recognize spoken queries set forth by a user of the application. In an exemplary embodiment, the ASR system can be customized based upon the data loaded into the spreadsheet application. For instance, the tabular data can include an entry "OT Pay", where the phrase element "OT" is an acronym for "overtime", and the phrase element "Pay" has its conventional semantic meaning. The phrase "OT Pay", however, is not a phrase that is typically used in the English language; accordingly, a conventional ASR system (even a large vocabulary ASR system) may have difficulty correctly recognizing the phrase "OT Pay" in a spoken utterance set forth by the user. For instance, the conventional ASR system may determine that the spoken utterance includes the phrase "old toupee", rather than "OT Pay".

In accordance with aspects described herein, the ASR system included in the application or otherwise accessible to the application can be customized based upon the tabular data. For instance, the ASR system may include an acoustic model, a lexicon model, and a language model, wherein the acoustic model models phones in a particular language, the lexicon model models elements (e.g., sequences of phones such as words or tri-phones), and the language model models sequences of elements. Pursuant to an example, one or more of the lexicon model or the language model can be updated based upon the tabular data. Continuing with the example set forth above, the language model can be customized to include the element sequence "OT Pay".

With more particularity related to the language model, the language model can be constructed based upon queries, commands, etc. that have been observed to be historically employed by a user or users when interacting with the application. That is, the language model can include a plurality of partially completed phrases with statistical probabilities defined for sequences of elements in the phrases. For instance, the language model can include the partially completed phrase "how much _____". This partially completed phrase can be completed based upon content of the tabular data. For instance, the character sequence "OT Pay" can be inserted into the empty region noted above, thus forming the complete phrase "how much OT Pay". This effectively constrains the search space of the ASR system, such that when the user sets forth the spoken utterance "how much OT PAY did our company pay last year", the ASR system can recognize that the user is referring to a particular entry or set of entries in the tabular data (e.g., for instance, a column header labeled "OT Pay").

Accordingly, the application can be configured to perform operations over tabular data responsive to receipt of voice commands. Such operations can include, but are not limited to, data sorting, mathematical functions over data, augmentation of tabular data, visualization of tabular data, and the like. Again, as the search space is constrained based upon content of the tabular data, the ASR system can relatively accurately decode spoken commands set forth by a user of the application.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIGS. 8 through 24 illustrate exemplary graphical user interfaces of a spreadsheet application.

DETAILED DESCRIPTION

Figure 1:
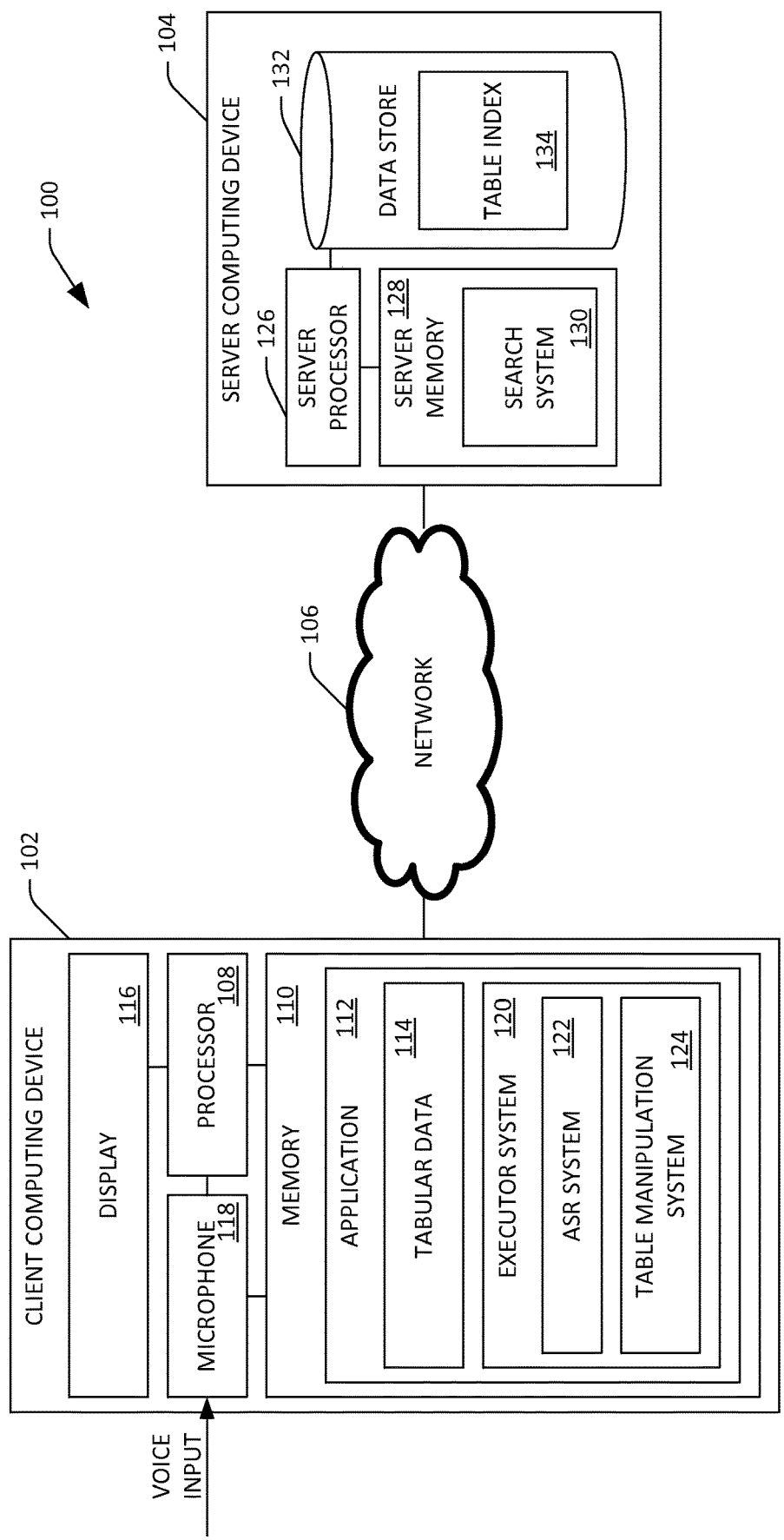
FIG. 1 is a functional block diagram of an exemplary system that facilitates decoding a spoken utterance based upon tabular data loaded into a spreadsheet application.

Various technologies pertaining to performance of operations over tabular data based upon voice input are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference now to FIG. 1, an exemplary system 100 that facilitates performance of an operation relative to tabular data based upon voice input is illustrated. The system 100 includes a client computing device 102, which can be but not limited to being a desktop computing device, a laptop computing device, a telephone, a tablet (slate) computing device, a wearable computing device, a video game console, a television, etc. The system 100 can optionally include a server computing device 104, wherein the client computing device 102 is in communication with the server computing device 104 by way of a network 106, such as the Internet.

The client computing device 102 includes a client processor 108 and a client memory 110. The client memory 110 has loaded therein an application 112 that is executed by the client processor 108. The application 112 has tabular data 114 loaded therein. Accordingly, the application 112 can be, for example, a spreadsheet application, a word processing application, a web browser, a slideshow presentation application, a database management system, etc. The tabular data 114 includes a plurality of entries arranged in rows and columns. An entry in the entries can include a text string, wherein the text string comprises a sequence of characters. The characters can be letters, numbers, and/or symbols. Further, in an example, the text string can be representative of an entity, wherein the entity can be a person, place, or thing. Moreover, the text string can be an entity name that describes entities associated with the entry that includes the text string. For instance, the text string may be included in a column header for a column. In a more particular example, the column header can include the text string "PEOPLE", and entries in the column can include respective names of people. It is to be understood that the text string may be in a row header or in the body of the tabular data 114.

The client computing device 102 also includes or is in communication with a display 116, wherein the client processor 108 can cause the tabular data 114 to be displayed on the display 116. The display 116 can be a touch-sensitive display, such that input can be provided to the application 112 through a gesture performed on the display 116. The client computing device 102 can also include or be in communication with a microphone 118. The microphone 118 receives voice input from a user of the client computing device 102 and generates a voice signal based upon the voice input. Thus, the voice signal is an electronic representation of the voice input.

The application 112 additionally includes an executor system 120 that is configured to execute computing operations relative to the tabular data 114 loaded into the application 112. Exemplary operations supported by the executor system 120 include, but are not limited to, sorting of data in the tabular data 114, filtering of data in the tabular data 114, performance of a mathematical operation over at least a portion of the tabular data 114, visualizing the tabular data 114 (e.g., generating graphs or charts that are representative of the tabular data 114), augmenting the tabular data 114 with other data, amongst others.

The executor system 120 can include an automatic speech recognition (ASR) system 122, wherein the ASR system 122 recognizes elements (words, acronyms, abbreviations, etc.) in the voice input responsive to receipt of the voice signal, and outputs a textual transcription of the voice input. The ASR system 122 can utilize data other than the voice signal to recognize elements in the voice input, including historical interactions with the application 112, location of eye gaze on the display 116, data from external sources, etc. As will be described in greater detail herein, the ASR system 122 can be customized based upon the tabular data 114 loaded into the application 112. When customized based upon the tabular data 114, the ASR system 122 can recognize elements in the voice input that are not typically used in a language being spoken by the user of the client computing device 102. In a non-limiting example, the ASR system 122 can recognize an acronym in the tabular data 114 that is uncommon or invented by a user of the application 112.

The executor system 120 also includes a table manipulation system 124 that is in communication with the ASR system 122. The table manipulation system 124 receives the transcription of the voice input generated by the ASR system 122, and performs the above-mentioned computing operation relative to the tabular data 114 responsive to receipt of the transcription.

As indicated previously, the system 100 optionally includes the server computing device 104, which is in network communication with the client computing device 102. The server computing device 104 includes a server processor 126 and a server memory 128. The server memory 128 includes a search system 130 that is executed by the server processor 126. The server computing device 104 also includes or is in communication with a data store 132 that comprises a table index 134, wherein the table index 134 indexes network-accessible tables (e.g., tables available on web pages that are accessible by way of the Internet). As noted previously, an exemplary operation that can be performed by the executor system 126 includes an augmenting of the tabular data 114. To augment the tabular data 114, the table manipulation system 124 can receive text (the transcription) output by the ASR system 122 and can construct a query based upon the received text. The table manipulation system 124 can transmit the query to the server computing device 104 over the network 106. The server processor 126 receives the query, and the search system 130 executes a search over the table index 134 based upon the query. With more particularity, the search system 130 performs a search over the table index 134 and identifies additional tabular data that is relevant to the query. The search system 130 can then transmit the additional tabular data to the client computing device 102 by way of the network 106, and the table manipulation system 124 can augment the tabular data 114 with the additional tabular data received from the server computing device 104.

Operation of the system 100 is now described. A user of the client computing device 102 can cause the application 112 to be loaded into the memory 110 and executed by the client processor 108. The client processor 108 can cause a graphical user interface (GUI) of the application 112 to be presented on the display 116. The user of the client computing device 102 can cause the tabular data 114 to be loaded into the application 112 (e.g., from the memory 110 or another data store) or can enter the tabular data 114 into the application 112 by way of a suitable input mechanism, such as a keyboard, the display 116, etc. As noted previously, the tabular data 114 includes a plurality of entries, wherein an entry in the entries comprises a text string.

Responsive to the tabular data 114 being loaded into the application 112, the ASR system 122 can be customized based upon the tabular data 114. For instance, the ASR system 122 can be customized based upon the text string in the tabular data. In a non-limiting example, the text string may be "OT Pay 2012", wherein "OT" is an acronym that represents "overtime", "PAY" has its known semantic meaning, and "2012" refers to the year 2012. The ASR system 122 can be customized to include "OT Pay 2012" in its lexicon model or language model, thereby allowing for the ASR system 122 to recognize the phrase "OT Pay 2012" when included in the voice input.

Furthermore, the ASR system 122 can be customized to contemplate known synonyms of text strings in the tabular data 114. In this example, the ASR system 122 can analyze contents of the tabular data and identify "OT Pay 2012" as being included in the tabular data, but not represented in the lexicon model of the ASR system 122. Responsive to identifying the above-mentioned text string, the ASR system 122 can search for known synonyms of portions of the text string "OT Pay 2012." For instance, the ASR system 122 can search a database of synonyms and determine that "overtime" is synonym for the acronym "OT" (e.g., particularly when used together with the word "Pay"). This allows the ASR system 122 to be robust with respect to how the user of the client computing device 102 refers to text strings in the tabular data 114. For instance, the user can set forth the following query, "sum all values in the overtime pay column". As the ASR system 122 is updated to contemplate known synonyms of the text string in the tabular data 114, the ASR system 122 can map "overtime" in the voice signal to "OT" included in the text string, and can output a transcription that includes "OT" therein (rather than "overtime"). In another example, the table manipulation system 124 can have knowledge of the synonyms, and can map "overtime" in the transcription to "OT". As indicated above, these mappings can be obtained from a database of known synonyms. In other examples, the mappings can be provided by a system administrator or an end user. The table manipulation system 124 can receive the text generated by the ASR system 122 and can perform the operation based upon such text. Further, prior knowledge over external data can be pushed up to the ASR system 122 to reduce errors. For instance, the ASR system 122 can be modified to include dictionaries of entities, attribute names, concepts, occurrence statistics and co-occurrence statistics over concepts, and attributes.

Further, as will be described in greater detail herein, the executor system 120 supports performance of operations relative to the tabular data 114 based upon a natural language query set forth by the user of the client computing device 102. As indicated above, the ASR system 122 can output a transcription that is representative of elements in the voice input received at the client computing device 102. The table manipulation system 124 can disambiguate between operations based upon, for example, content of the tabular data 114. For instance, the table manipulation system 124 can identify types of entities in the tabular data 114 (e.g., people, places or things). The table manipulation system 124 can then employ such known types to disambiguate between interpretations of a natural language query. When the table manipulation system 124 interprets a user query, the table manipulation system 124 can use contents of the tabular data 114, and potentially remotely identified data (identified by the search system 130) to generate programmatic interpretations of the natural language query (e.g., programs that are believed to perform the task requested in the natural language query set forth by the user of the client computing device 102). Other exemplary data that can be used by table manipulation system 124 includes probability, reliability and density of a particular attribute for a certain entity or entity type.

Figure 2:
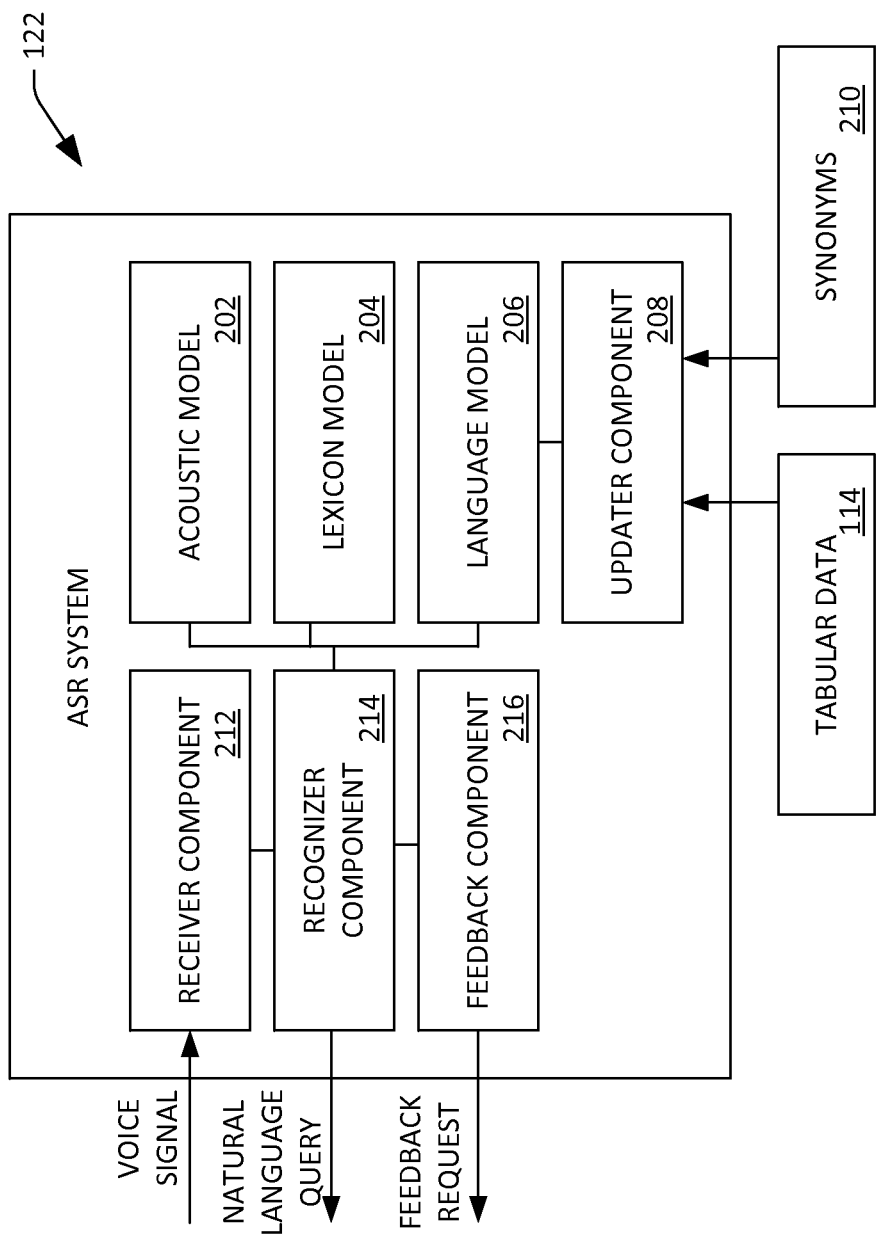
FIG. 2 is a functional block diagram of an exemplary automatic speech recognition (ASR) system that can be customized based upon tabular data loaded into an application.

Now referring to FIG. 2, an exemplary functional block diagram of the ASR system 122 is illustrated. The ASR system 122 may include any suitable computing structure to perform recognition tasks. For instance, the ASR system 122 can be or include a hidden Markov model (HMM), a Gaussian mixture model (GMM), a neural network, a deep neural network (DNN), etc. The ASR system 122 includes an acoustic model 202, a lexicon model 204, and a language model 206. The acoustic model 202 models phones in a language of interest. For example, there are approximately 40 phones in the English language, and the acoustic model 202 can statistically model these phones. The lexicon model 204 defines entities that are to be recognized by the ASR system 122. Conventionally, these entities are words. In another example, however, the entities can be sequences of phones (tri phones), wherein the lexicon model 204 defines probabilities over phone sequences. The language model 206 defines probabilities over entity sequences. In an example, the language model 206 can indicate that if the words "how" and "far" are recognized with high probability in sequence, then there is a high probability that the next word is "away".

The ASR system 122 also includes an updater component 208 that is configured to customize the language model 206 based upon text strings in the tabular data 114. Pursuant to an example, the language model 206 can initially include blank spaces or slots in phrases observed to be historically used by users of the application 112. For example, these phrases can be mined from the web, through monitoring user interaction with a spreadsheet application, etc. Exemplary partial phrases can include word sequences such as "sum up", "how much", "sort based upon", amongst others. The blank spaces or slots may then be populated with text strings extracted from the tabular data 114, and probabilities over the completed sequences can be computed and included in the language model 206.

Continuing with the example set forth above, the partially completed phrase "sum up _____" can be completed with the text string "OT Pay" (e.g., to form the sequence "sum up OT Pay"). Likewise, the partially completed phrase "how much _____" can be completed with the text string "OT Pay" (e.g., to form the sequence "how much OT Pay"). Probabilities over these sequences can be computed based upon context of the text string in the tabular data; for example, the text string "OT Pay" can be a column header, and column entries can be numerical. Thus, a high probability can be computed that "OT Pay" successfully completes a phrase when the phrase refers to numerical values (e.g., "how much", "sum up", . . . ). Conversely, a low probability can be computed that "OT Pay" successfully completes a phrase when the phrase refers to alphabetical values (e.g., "alphabetically arrange").

Additionally, the updater component 208 can receive synonyms 210 and can update the language model 208 to contemplate such synonyms. For example, as indicated above, "overtime" can be a known synonym for the acronym "OT"; thus, the updater component 208 can customize the language model 206 based upon the known synonyms of the text string in the tabular data 114. Still further, as referenced above, the updater component 208 can customize the language model 206 based upon known semantic information about text strings in the tabular data 114. For instance, if the tabular data 114 includes a column header titled "AGE", then known semantics pertaining to this word such as youngest to oldest, Jr. versus Sr., etc. - can be known, and probabilities over word sequences can be computed based upon the known semantics.

In summary, the language model 206 can initially be structured based upon queries frequently issued to the application 112 and/or commands frequently issued to the application 112 (where the queries and commands are historically observed). The updater component 208 can then customize the language model 206 based upon the content of the tabular data 114. In addition, the updater component 208 can customize the language model 206 based upon observed historical actions of the user of the client computing device 102. For instance, if the user initially assigns a name "overtime pay" to a column header, and subsequently shortens the name to "OTP", then it can be inferred that "OTP" is an acronym for "overtime pay", and the updater component 208 can update the language model 206 accordingly.

Operation of the ASR system 122 is now described. The ASR system 122 includes a receiver component 212 that receives a voice signal. As indicated above, the voice signal is an electronic representation of voice input set forth by a user of the application 112. A recognizer component 214 is in communication with the receiver component 212 and accesses the models 202-206 to output a most probable phrase in the voice input. In an example, this most probable phrase may be a natural language query. In operation, the recognizer component 214 can sample the voice signal and obtain probability distributions over phones, which may be employed to generate probability distributions over potential elements (words), which may then be employed to generate probability distributions over potential element sequences. As the language model 206 is somewhat constrained, the recognizer component 214 can compute the probability distributions over the elements sequences relatively efficiently.

The ASR system 122 may also optionally include a feedback component 216 that can output a feedback request to the user when the recognizer component 214 is unable to appropriately map contents of the voice signal to an element sequence modeled by the language model 206. In such an example, the feedback component 216 may output a plurality of potential phrases and request that the user of the client computing device 102 identify the appropriate phrase (e.g., by way of voice command, by way of touch, etc.). The feedback component 216, in an example, may further update the language model 206 based upon the feedback from the user.

Figure 3:
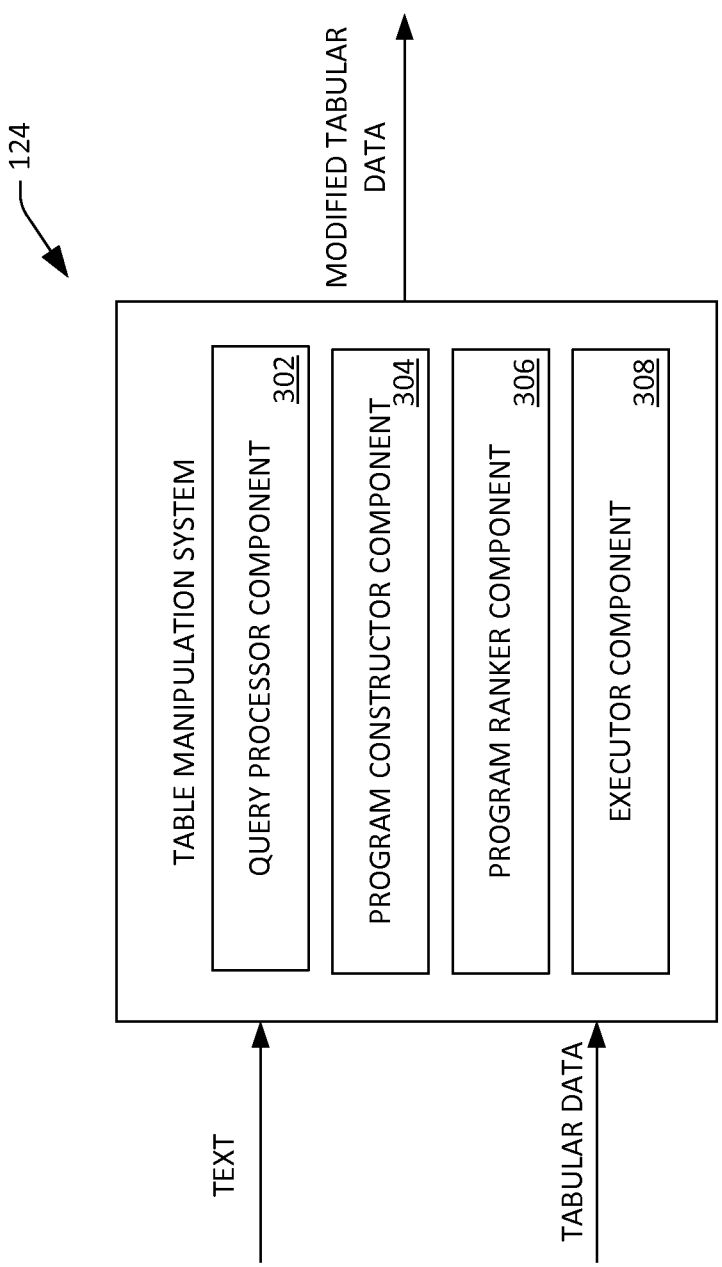
FIG. 3 is a functional block diagram of an exemplary table manipulation system that can modify tabular data loaded into an application based upon a natural language query.

Now referring to FIG. 3, an exemplary depiction of the table manipulation system 124 is illustrated. The table manipulation system 124 receives the text output by the ASR system 122 and further receives the tabular data 114 loaded into the application 112. The tabular data 114 includes data that is to be manipulated by the table manipulation system 124 based upon the text. Manipulation of the tabular data 114 includes augmenting the tabular data 114 with additional data, visualizing the tabular data 114, etc. In an example, the tabular data 114 can be explicitly identified in the text. In another example, the tabular data 114 may be currently being displayed on the display 116. In still yet another example, the tabular data 114 may be identified by the user in some other way, such as copying and pasting a plurality of cells, copying and pasting of a sub-table, etc.

The table manipulation system 124 comprises a query processor component 302 that is configured to determine an intent of the user based upon the natural language query (as embodied in the text output by the ASR system 122). In an exemplary embodiment, in connection with determining such intent, the query processor component 302 can compare text in the natural language query with attributes in the tabular data 114 or known to correspond to the tabular data 114, including but not limited to row headers, column headers, metadata description of the tabular data 114, title of the tabular data 114, previous actions of the user, known synonyms for text strings in the tabular data 114, known abbreviations for text strings in the tabular data 114, etc. In an example, the tabular data 114 received by the table manipulation system 124 may include three columns; a first column having a header title of "COMPANY", a second column having a header title of "PROFIT", and a third column having a header title of "EMPLOYEES". In an example, the natural language query can be "sort by number of employees". The query processor component 302 can consider context to determine that the natural language query is directed to the tabular data 114 currently displayed on the display 116. The query processor component 302 may then identify that the term "employees" in the natural language query is also a header title for a column in the tabular data 114. The query processor component 302 can further identify the word "sort" in the natural language query and can determine that such word indicates a desire of the user that contents of the tabular data 114 be arranged as a function of a particular attribute, and in this case, the attribute "employees" is identified in the natural language query.

The table manipulation system 124 can further include a program constructor component 304 that can construct a plurality of different programs based upon processing performed over the natural language query by the query processor component 302. For instance, the query processor component 302 can generate several different interpretations of the natural language query and the program constructor component 304 can construct a respective plurality of different programs corresponding to the different interpretations.

The table manipulation system 124 may further include a program ranker component 306 that can rank the programs generated by the program constructor component 304. The program ranker component 306 can rank the programs based upon a plurality of different parameters including respective numbers of invalid values that would be generated when the programs are executed over the tabular data 114, respective numbers of null values that would be generated when the programs are executed over the tabular data 114, overall frequency of operations in the programs employed by users of the application 112, etc.

An executor component 308 can execute the most highly ranked program over the tabular data 114, thereby performing a table manipulation in accordance with the natural language query. As will be shown and described herein, a graphical user interface of the application 112 can include a conversation field that displays descriptions of operations performed by the table manipulation system 124 based upon the natural language query, such that the user of the client computing device 102 can audit such operations. Moreover, the resultant tabular data can be presented to the user in the spreadsheet application, thereby allowing the user to review operations made by the table manipulation system 124.

Figure 4:
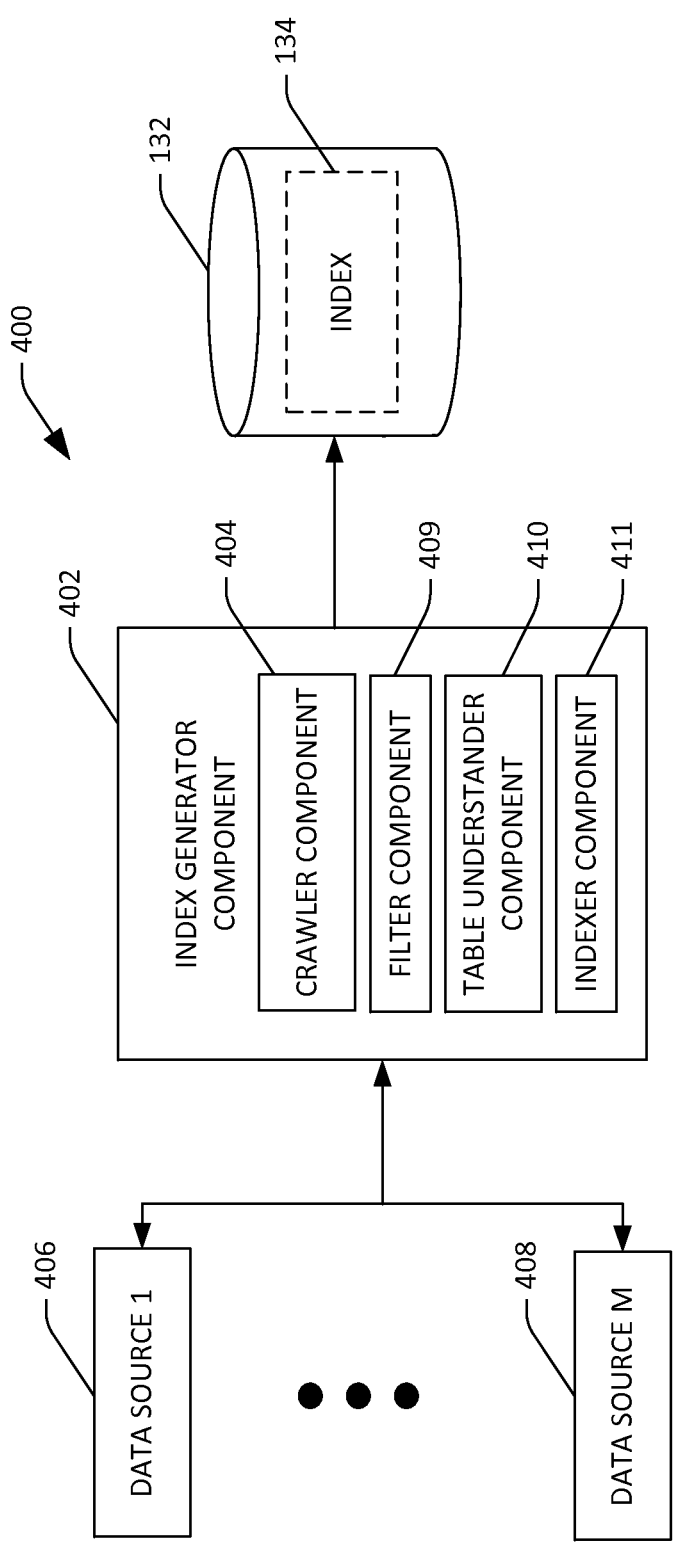
FIG. 4 is a functional block diagram of an exemplary system that facilitates constructing an index that indexes network accessible tables.

With reference to FIG. 4, an exemplary system 400 that facilitates generating the table index 134 is illustrated. The system 400 includes an index generator component 402. The index generator component 402 comprises a crawler component 404 that is configured to retrieve tabular data from a plurality of different network-accessible data sources 406-408. For instance, such network-accessible data sources can be web pages. In an exemplary embodiment, the crawler component 404 can be configured to periodically (or from time to time) crawl over contents of a plurality of predefined data sources that are known to include reliable and accurate tables. Thus, the crawler component 404 can access curated data sources and retrieve tables therein. In another exemplary embodiment, the crawler component 404 may have access to search logs of a general-purpose search engine and can identify tables in web pages through, for instance, reviewing HTML tags of the web pages. In still another example, one or more tables can be included in personal data of a user (e.g., stored on a client computing device or in a network-accessible storage device that stores data for the user). The index generator component 402 can additionally include a filter component 409 that filters tables that do not have valuable content or have inaccurate content.

With still more detail, the crawler component 404 can be configured to crawl over the data sources 406-408 and extract text fragments from within <table> and </table> tags. Several types of tables exist within such tags. For instance, formatting tables, which are used for formatting and layout purposes, are included in such tags. Formatting tables typically do not have useful content and therefore, the filter component 409 can filter such tables from inclusion in the index 134. Another type of table that can be included in the above-noted tags are attribute-value (AV) tables, which describe attributes and values of a single entity. An example of such tables includes info boxes found in wiki pages, which typically include a title row that includes the name of an entity, followed by a set of rows that describe various attributes for the entity and respective values of the attributes. For instance, an entity corresponding to an AV table may be a movie, attributes for the movie may be "release date", "actors", "actresses", "rating", etc. AV tables often include useful information, and the filter component 409 can identify such tables and label them as AV tables.

Another type of table includes a relational table, which includes information about a set of entities typically pertaining to a topic. Rows of a relational table include information about respective entities. Columns of the relational table represent respective attributes of the respective entities. An exemplary relational table is set forth below for purposes of explanation.

| City | 2011 Estimate | 2010 Census | 2000 Census | County |
|---|---|---|---|---|
| Aberdeen | 16,835 | 16,896 | 16,461 | Grays Harbor |
| Airway Heights | 6,138 | 6,114 | 4,500 | Spokane |
| Algona | 3,074 | 3,014 | 2,460 | King |
| Anacortes | 15,941 | 15,778 | 14,557 | Skagit |

In the exemplary relational table, the entities are cities and the topic is population of such cities over time. Relational tables typically include useful information but are desirably distinguishable from AV tables. Distinguishing between relational tables and AV tables can be useful in understanding information included in these different types of tables. Further, there are several different types of relational tables, including wraparound tables, where the entity column and attribute columns wrap around in the tables. An exemplary wraparound table is set forth below.

| Municipality | Mayor | Municipality | Mayor | Municipality | Mayor |
|---|---|---|---|---|---|
| Cleveland | Jackson | Detroit | Bing | Louisville | Fischer |
| Seattle | McGinn | Houston | Parker | Las Vegas | Goodman |
| Los Angeles | Garcetti | Orlando | Dyer | Atlanta | Reed |

The filter component can be configured to distinguish between relational tables of different types in an automated fashion. For instance, the filter component 408 can identify features of a table under review and can include a classifier that is trained to distinguish between table types based upon such features. Exemplary features that can be employed by the filter component 409 to distinguish between tables includes, but are not limited to, fractional size of a table relative to a web page that includes the table, a line number of the web page where the table begins, a number of rows of the table, a number of body rows of the table, a number of header rows of the table, etc.

The index generator component 402 can further include a table understander component 410 that reviews various attributes of a table retrieved by the crawler component from one of the sources 406-408. For instance, the table understander component 410 can be configured to identify a "subject column", wherein a subject column identifies entities in respective rows of the table. The problem of identifying a subject column is related to key column identification in databases, but not identical. For instance, distinctness of values in a column is one of the indicators of a subject column, but not the sole indicator. The table understander component 410 can employ a variety of features in connection with identifying subject columns in relational tables. For instance, position of the column in the table (e.g., how far left the column is in the table; the further to the left, the more likely the column is a subject column), as well as nonnumeric characteristics can be used in connection with identifying the subject column of the table. Further, the table understander component 410 can compute co-occurrence of known entities and column names across tables from the data sources 406-408, wherein a number of co-occurrences can be useful in connection with identifying subject columns of a table. For instance, the larger the number of co-occurrences (in several tables) of an entity in a particular column name, the more likely the column that has the column name, represents a subject column.

The table understander component 410 can also be configured to identify column names. In some cases, HTML tags can be used to explicitly specify names of columns. In practice, however, a relatively large number of tables do not utilize such tags. For instance, some tables on web pages have column names included as a data row in a table (e.g., the first data row in the table). Others do not specify column names. The table understander component 410 can identify tables from the data sources 406-408 that have column names specified in the first data rows of such tables. With more particularity, the table understander component 410 can review numerous tables from the data sources 406-408, and for a particular string, can compute a frequency of occurrence of the particular string as an explicitly identified column name (e.g., identified by HTML tags), a frequency of occurrence of the particular string in first rows of the numerous tables, and frequency of occurrence of the particular string in non-first rows of the numerous tables. The table understander component 410 can compute such frequencies for several strings that are believed to be potential column names. The table understander component 410, for a table with no explicitly identified column names, can utilize the frequencies corresponding to strings in a first row of the table to determine whether such first row includes column names. The table understander component 410 can then classify the first row as being a row that includes column names.

Still further, the table understander component 410 can compute values indicative of trustworthiness of contents of tables, as well as trustworthiness of attributes of the tables. To compute such values, the crawler component 404 can output (entity attribute name value) triples for entries of entity attribute binary (EAB) tables across the data sources 406-408. The table understander component 410 can review an amount of agreement between values across the data sources 406-408, and a score can be assigned to each row in an EAB table based upon the amount of agreement. The table understander component 410 can roll up (aggregate) scores to a column level of a table to compute the popularity (trustworthiness) of the attribute. The scores may also be aggregated up to a table level to compute trustworthiness of table values.

To facilitate querying the resultant index 134, the table understander component 410 can further be configured to annotate tables retrieved by the crawler component 404. Often, table headings, captions, and surrounding text on web pages lack a rich description of a table or fail to provide alternate ways of describing the table or contents thereof. The table understander component 410 can thus automatically annotate a table with descriptions, wherein the descriptions can be a function of contents of search engine click logs. For example, a table can be annotated with text from a query submitted to a search engine, wherein an issuer of the query clicked on the web page that includes the table.

The index generator component 402 further includes an indexer component 411 that builds the index 134 and causes the index 134 to be retained in the data repository 132. In an exemplary embodiment, the indexer component 411 can build a plurality of indices on the tables retrieved by the crawler component 404. With more particularity, the indexer component 411 can generate a keyword index, which is an inverted index that includes a mapping from keywords to various fields in the table. For instance, the inverted index may include the following mapping:

Keyword (WebTableId, FieldCode, ColIndex, RowIndex, #totalTokensInField, sumLogFrequency), where WebTableId is an identifier of a table; FieldCode is the type of the field, and can have any of the following values: ATTRNAMEINBODY, HEADER, CAPTION, FOOTER, PAGETITLE, PAGEHEADING, PAGEANCHORTEXT; SURROUNDINGTEXT, TABLECELL, URL; ColIndex is the index of the column, and can be populated when the FieldCode value is ATTRNAMEINHEADER, ATTRNAMEINBODY, or TABLECELL (otherwise can be assigned a null value or −1); RowIndex is the index of the row, and can be populated with the FieldCODE value is TABLECELL (otherwise can be assigned a null value or −1), #totalTokensInField is the total number of tokens in the field; and sumLogFrequency is the sum of the log of the frequencies of the tokens in the field.

A difference in this index 134 from traditional inverted indices over documents is that the index 134 stores structural information that is not relevant in connection with documents. The last two pieces of information enable computation of whether the match of the query with the content of the field is a full or partial match.

Further, the indexer component 411 can build WF and TF indices. Such indices include static features for tables crawled by the crawler component 404 and EAB tables derived from such tables. For instance, a WF index for a particular table includes a number of rows of the table, a number of columns of the table, a position of the table in a web page, size of the table relative to the page, static rank of the page that includes the table (e.g., from search engine logs), a domain rank of the page that includes the table (e.g., from search engine logs), etc. The TF index for a particular table includes a number of distinct values in the table, fraction of null names, and attribute popularity numbers.

The indexer component 411 can further build a WC index. Such index includes the content of the table themselves and can be used to generate a snippet for a table and to display or import the actual table when it is requested. For instance, the WC index can include original HTML, parsed HTML, URL, caption, column names, header rows, footer rows, page title, page heading, anchor text, surrounding text, meta keywords, meta description, and ODP categories.

Moreover, the indexer component 411 can build a string mapping index and a string frequency index. The string mapping index includes a global string to identify a mapping across all tables and fields. The string frequency index maps a string ID to frequency for various coarse-grained field types. There is an overall frequency irrespective of fields.

Additionally, the indexer component 411 can build an ETV index that maps the entity name to the EAB tables that include that entity (in the key column) and its corresponding value. The keyword index, the ETV index and WF/TF indices are used for query processing and ranking. The string mapping and string frequency indices are used for query to ID mapping, while the WC index is used in connection with generating snippet and returning values from a table responsive to receipt of a query.

Figure 5:
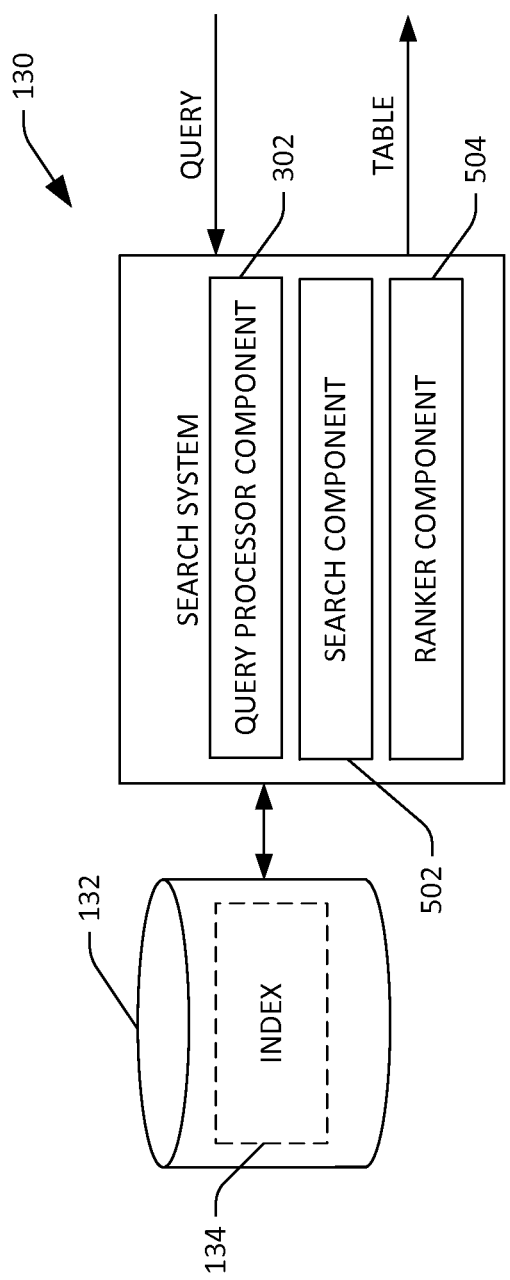
FIG. 5 is a functional block diagram of an exemplary data retrieval component that can execute a query over an index that indexes tables and output a ranked list of tables based upon the query.

With reference now to FIG. 5, the search system 130 is illustrated. The search system 130 can optionally comprise the query processor component 302. In another exemplary embodiment, query processing undertaken by the query processor component 302 can be performed in the table manipulation system 124 or distributed between the search system 130 and the table manipulation system 124.

As indicated above, the user can set forth a natural language query in a spoken utterance, wherein the query represents a request to retrieve tabular data (e.g., a table) from at least one of the data sources 406-408, wherein the index 134 was built from tables from the data sources 406-408. The query processor component 302 can process the received natural language query in connection with identifying the intent of the issuer of the query.

The search system 130 further includes a search component 502 that searches over the index 134 responsive to the query processor component 302 processing the received natural language query. As will be described in greater detail below, the search component 502 can identify several tables or portion thereof that are potentially relevant to the natural language query. A ranker component 504 can rank tables retrieved from the index 134 by the search component 502. The search system 130 can return the most highly ranked table, such that the most highly ranked table can be loaded in the application 112 (and augment the tabular data 114 loaded therein).

Additional detail pertaining to actions of the system 130 are now provided. In an exemplary embodiment, the natural language query can be in the form of a keyword search, similar to the types of query set forth by users of search engines. Examples of such types of search include, for instance, "GDP of African countries", "cities in Washington", etc. The search system 130 is configured to locate tables that match the intent of the user. In another example, the natural language query can be or include a data finding data (DFD) query. The tabular data 114 can be specified by the user of the client computing device 102, wherein the application 112 may be a spreadsheet application that has the tabular data 114 loaded therein. In such an example, the search system 130 can be configured to locate tables from the data sources 406-408 that, 1) can be used to enrich the tabular data 114 loaded in the application 112 or, 2) are in some way related to the tabular data 114. The search system 130 can support two different types of DFD searches: 1) an entity-attribute table search; and 2) an entity-only table search. An entity-attribute table search refers to when a table received by the search system 130 (e.g., loaded in the application 112) has a set of entities represented therein, wherein the set of entities are desirably enriched. For instance, the tabular data 114 loaded in the application 112 may include a list of cities. The natural language query can specify an attribute that can be used to augment the tabular data 114. For instance, the natural language query can specify a particular attribute (e.g., population). The search system 130 can be configured to locate tables that include information about such attributes that pertain to the entities in the tabular data 114.

An entity-only table search refers to when the tabular data 114 received by the search system 130 (e.g., that is loaded in the application 112) includes entities that are desirably enriched, but the attribute is unspecified in the natural language query (e.g., the attribute may be unknown to the user). In such case, the search system 130 can be configured to search over the index 134 and locate tables that include one or more attributes known to be related to such entities (e.g., if the entities are cities, attributes known to be related to the entities may include population, crime rate, average temperature, etc.) In an exemplary embodiment, responsive to attributes believed to be related to the entities in the tabular data 114 being located by the search system 130, such attributes (e.g., a list of a threshold number of most highly ranked attributes) can be surfaced and the user can select desired attributes. Thereafter, the search system 130 can enrich the tabular data 114 loaded in the application 112 with values for such attributes for the entities in the table.

In an exemplary embodiment, the search component 502 can include a global aggregator service (GAS) and a plurality of local aggregator services (LASs). An LAS is responsible for a subset of tables from the data sources 406-408 that are represented in the index 134. The GAS can receive a DFD or keyword search query set forth by the user. The GAS can perform simple alterations on the query, such as stop word removal and stemming. Thereafter, keywords can be mapped to identifiers (e.g., table identifiers) by invoking a string mapping service and frequencies and/or inverse document frequencies (IDFs) can be collected by invoking an IDF service. The string IDs and the IDFs can be sent to various LASs. An LAS can return top k table identifiers along with score and keyword hit information to assist in selecting snippet rows. The GAS can consolidate the results, eliminate duplications, diversify results, and generate dynamic query dependent snippets.

The LAS can host a keyword index, feature index, and ETV index for a particular subset of tables from the sources 406-408. With respect to keyword queries, for each query token, an LAS walks down the posting list in the keyword index and compiles a list of tables that have a keyword hit. Such tables with keyword hits are identified as candidate tables. The ranker component 504 can estimate the ranking score of each candidate table by computing the ratio of a sum of IDFs of tokens that hit the candidate table over a sum of IDFs of all of the tokens in the query. Candidate tables may then be processed in the descending order of their estimated scores. First, the ranker component 504 can compute a hit matrix for the candidate table (e.g., the detailed keyword hit positions at each field of the candidate table). Subsequently, the static features for the candidate table can be retrieved from the WF and TF indices, such as page rank of the page from which the table was retrieved, which columns are entity columns, which columns are attribute columns, how many null values are in each column, how many distinctive values are in each column, etc. The hit matrix may then conceptually be overlaid with the column type information to put keyword hits in logical region. Thereafter, ranking features can be computed to feed into the ranker component 504 to generate a final ranking score. Exemplary features can be a BM25F table, a BM25F description, page rank, domain rank, attribute popularity of all attributes, attribute popularity of attributes that keyword hits, etc.

Exemplary operations that can be supported by the table manipulation system 124 and the search system 130 are now set forth. In an example, when the table manipulation system 124 interprets a natural language query, it can employ data from tables loaded into the application 112 and/or tables from one or more of the data sources 406-408 represented in the index 134. Thus, the program ranker component 306 can rank programs constructed by the program constructor component 304 based upon native and external tables, as well as data indicative of probability, reliability and density of a particular attribute for a certain entity or entity type. Further, previous user requests can also be employed in connection with ranking.

The search system 130, in an example, can import a single column from a table from one or more of the sources 406-408. For example, single column import may desirably be performed responsive to receipt of the following exemplary natural language queries: "what industry is each company in", "Import 2012 revenue for these companies from SOURCE ONE", or "import a list of the 50 U.S. states". The query processor component 302 can determine if there is an interpretation of a query that maps the query to a specific data column from a specific data source (e.g., with a likelihood above a threshold). If there is a relatively large amount of uncertainty, the search system 130 can request that the user clarify her intent. For instance, the search system 130 can present information such as the following to the user: a list of data sources; potential query refinements; potential attributes, etc. Such information can be presented in drop down menus, as selectable links, in pop-up fields, etc. In another example, if there is a relatively large amount of uncertainty, then a failure notice may be presented to the user, or a different interpretation of the natural language query can be attempted. In another example, a default can be to provide most recent data or use other data, such as data indicative of attribute popularity.

Further, the search system 130 can support import of data pertaining to multiple attributes based upon a single natural language query. Thus, the search system 130 can support natural language queries such as "show me account managers for these companies", such that the search system 130 can cause a table loaded into the application to be enriched with columns corresponding to names of account managers, email addresses of the account managers, and phone numbers of the account managers. The search system can determine which attributes to provide to the application 112 based upon, for instance, popularity of the attributes.

Still further, the search system 130 can link data retrieved from the index 134 with a particular action/metadata, and/or the application 112 can perform such linking. For instance, if e-mail addresses are imported, the search system 130 can assign hyperlinks thereto, such that an e-mail application is initiated upon user selection of a hyperlinked e-mail address. In another example, a table entry can have a number that represents a telephone number. The search system 130 can assign metadata to the table entry to indicate that the table entry is a telephone number. This can cause the phone number to be added to a contact list of the user. In another example, the user can set forth a voice command (e.g., "call John Doe"), which can cause the table entry identified as a telephone number that corresponds to the entity John Doe to be dialed.

The system 100 further supports implicit aggregation and drill down. For instance, a table loaded in the application 204 may comprise two columns: "Company" and "Sales". The search system 130 and/or the table modification system 124 support queries such as "group sales by industry", such that table entries are aggregated by the implicit attribute "industry." Another exemplary supported query is "show me companies in Cleveland", where the search system 130 filters table entries by the implicit value "Cleveland". In yet another example, the query "show me companies in King County" is supported, wherein the system, responsive to receiving such query, filters table entries by which the implicit value "King" with attribute context "County." In still yet another example, the system 100 supports the query "show me average population for states in the U.S." For instance, the system 100 may respond to such query completely over implicit attributes. Further, the system 100 can fetch states and populations from an external data source, and then perform implicit filtering thereover. Moreover, the system 100 can support queries such as "compute the maximum county population for each state", such that the system can join entries from multiple tables (e.g., a table for each state), followed by performing an aggregate operation.

The system 100 further supports nested queries, such as depicted in the following query sequence: "show me the population for each state", followed by "break it down by county". This is a drill-down example. Another exemplary query supported by the system 100 includes "show me total sales for companies in the Pacific Northwest grouped by state" followed by "break it down by County". This is a multi-step, nested/contextual drill down query. The system 100 can first create a new table of total sales filtered to only companies in Pacific Northwest states, then group the sales by state. The second query acts upon such table and allows a pivot table to be created, which drills down into sales by county. Other exemplary queries such as "show me profit for 2012", followed by "how about for 2011" can be supported by the system. These exemplary queries represent a multi-step context-aware external data search. If a most recent operation was an external data search, the system 100 can detect the possible refinement and change the external data ranking accordingly.

Furthermore, the system 100 can support importing of time-series data. For instance, responsive to receipt of the query "plot a line graph of China GDP from 2000 to 2012" the system 100 can retrieve the appropriate data and plot the specified chart in a spreadsheet application.

As indicated above, the features herein are not so limited to a spreadsheet application. For instance, the user can request or set forth commands outside the context of the spreadsheet application. That is, the user can set forth queries via a telephone and the query can be interpreted over all spreadsheets and data to which the user has access. This can be thought of as a virtual spreadsheet (with many virtual external data columns), which has been opened and that supports operations.

Furthermore, the system 100 can be integrated with a mapping and/or charting application. For instance, there are many related aspects to displaying data in a specific chart or map types. Thus, if the query "show me a map of the number of companies in each state" is received, the system 100 can make a call to an external data service to fetch a state for each company. Other exemplary queries include "zoom in at the county level" and "show 2012 profit instead", where the system 100 retrieves external data to update a map or chart responsive to receipt of such queries.

Furthermore voice-enabled data cleaning can be supported by the system 100, such that the user can set forth a command "change the state column to its abbreviation", which refers to an in-place data update. The system 100 can perform the requested data cleaning responsive to receipt of the voice command. Another exemplary query set forth by the user can include "prepend the area code to each phone number."

Furthermore, the system 100 can support contextual speech correction. In an exemplary embodiment, the user may wish to add a column pertaining to an attribute "incarcerations" to a particular table, and can accordingly set forth the spoken query "add incarcerations". Responsive to receipt of such query, the system 100 may (incorrectly) add a column corresponding to the attribute "cancer rate". The user, upon reviewing this incorrect interpretation, can say "no, incarcerations". The system 100 can retain context about previous commands/queries set forth by the user, remembering that the user requested an "add". The system 100 can then correct the table to include an "incarcerations" column. In another example, the user can set forth a command "show me a list of states with population greater than 1,000" and the system 100 can provide the user with a table that includes a list of states in the United States. The user, however, may have intended to review Russian states with population greater than 1,000, and can say "no, Russian states". Again, the system 100 can retain context about the conversation and perform appropriate corrections.

Still further, the system 100 can support spoken correction of data retrieved by the search system 130. For example, the search system 130 may use a fuzzy join to match entity names in a spreadsheet loaded in the application 112 with those located in an external source. For instance, a spreadsheet loaded in the application 112 may include a column "CMPNY", while the table retrieved from the external data source may be labeled "COMPANY". The search system 130 may misalign such columns (e.g., cause a resultant table to include both columns), and the user can correct such alignment by setting forth the command "match 'CMPNY' with 'COMPANY'". The table manipulation system 124 may merge such columns, remove the "COMPANY" column, etc. Further, spoken correction of text to speech can be supported. For instance, the system 100 can be configured to audibly output information as to processing being performed by the system 100. In an example, the system 100 can audibly output "showing total sales in Missouri." The user may pronounce Missouri differently and can state "it's pronounced Missoura". The system 100 can be updated accordingly. Still further, the system 100 supports bi-direction speech interaction with the application 112.

Figure 6:
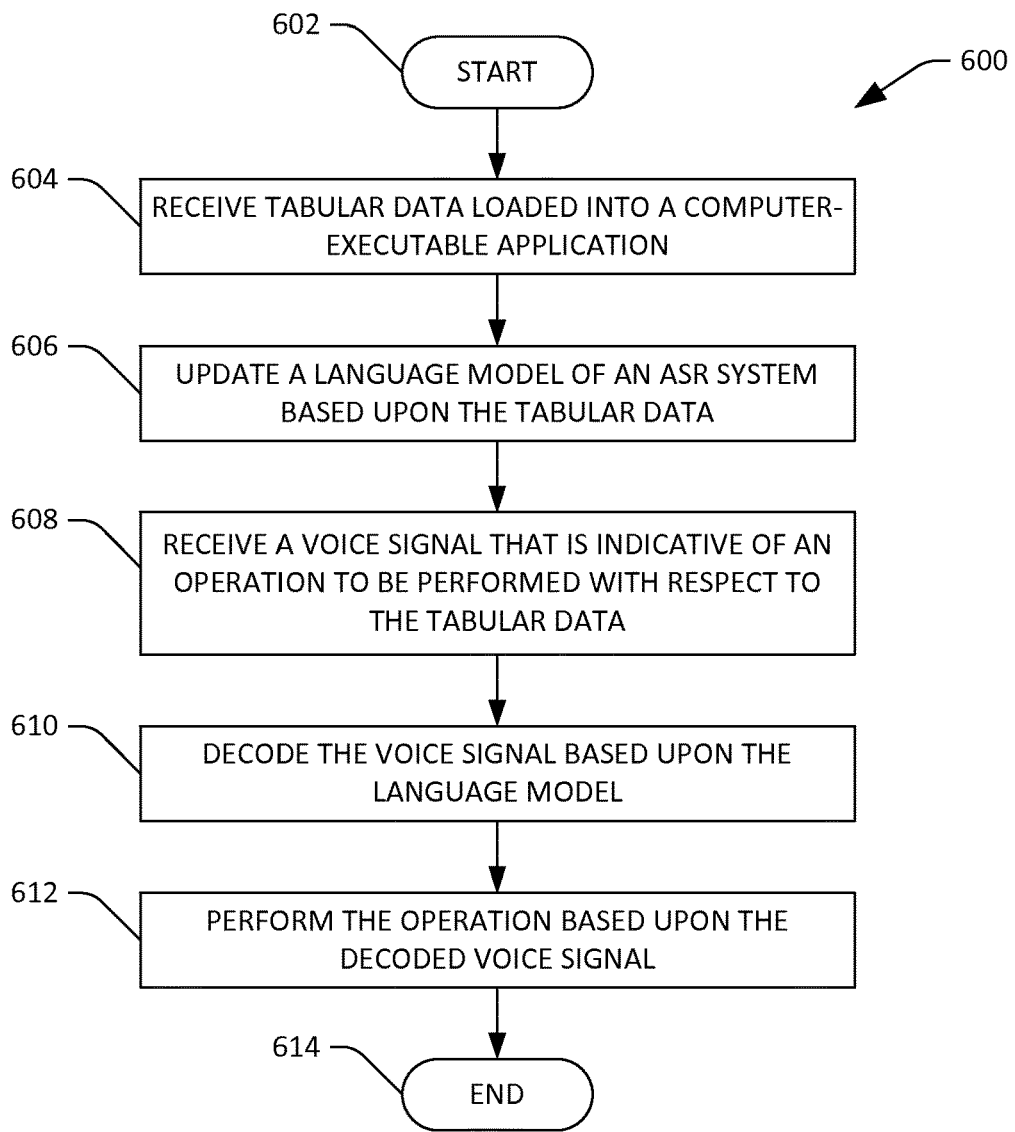
FIG. 6 is a flow diagram that illustrates an exemplary methodology for performing a computing operation over tabular data based upon the decoding of a voice signal that is representative of a spoken utterance of a user.
Figure 7:
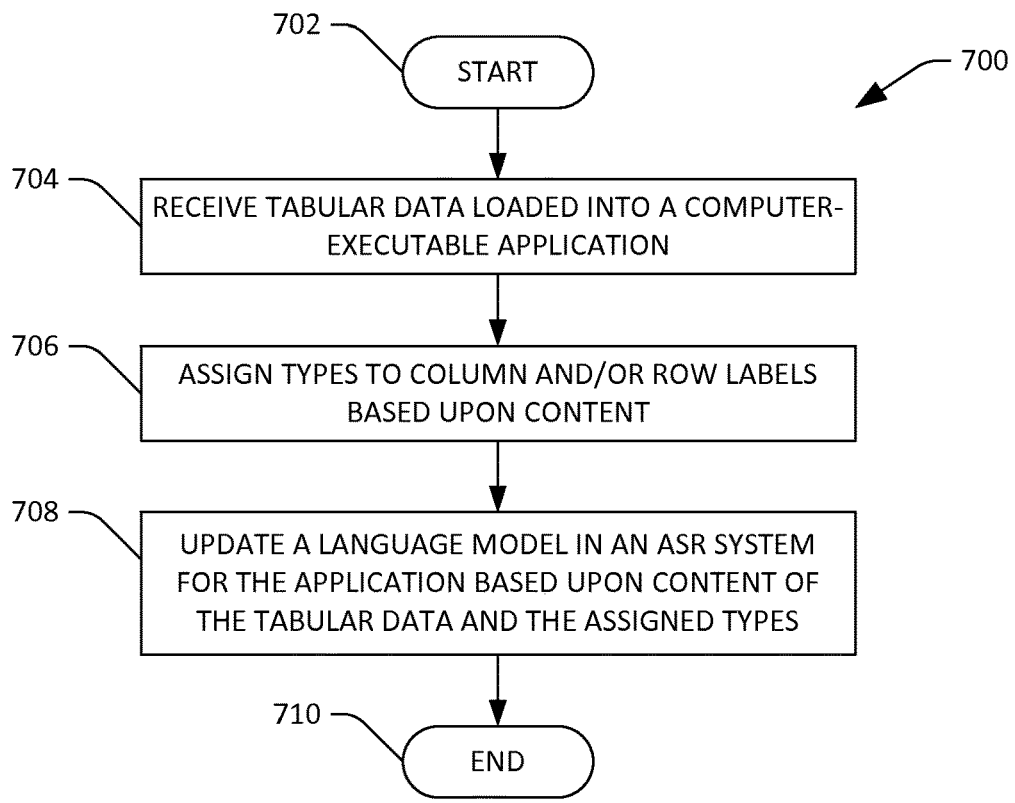
FIG. 7 is a flow diagram that illustrates an exemplary methodology for updating a language model in an ASR system based upon content of tabular data loaded into an application.

FIGS. 6-7 illustrate exemplary methodologies relating to performing operations over tabular data based upon speech input. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring to FIG. 6, an exemplary methodology 600 for performing an operation relative to tabular data loaded into an application is illustrated. The methodology 600 starts at 602, and at 604 tabular data that is loaded into a computer executable application is received. As indicated above, the application can be a spreadsheet application, a word processing application, a web browser (e.g., in communication with a server-based spreadsheet application), etc. At 606, a language model of an automatic speech recognition system is updated (customized) based upon the tabular data received at 604. For example, the language model can be updated to include acronyms, text, etc. included in the tabular data.

At 608, a voice signal is received that is indicative of an operation to be performed with respect to the tabular data. For example, the voice signal can be representative of voice input that indicates a particular command supported by application and may include reference to a portion of the tabular data received a 604. In another example, the voice signal can represent a natural language query set forth in voice input of a user.

At 610, the voice signal is decoded based upon the language model. That is, the updated language model is employed to generate a transcription of the voice input. At 612, the operation is performed relative to the tabular data based upon the decoding of the voice signal. As indicated previously, text recognized by the ASR system can be provided to a system that is configured to disambiguate the intent of the user with respect to the tabular data loaded in the application. The methodology 600 completes at 614.

Now referring to FIG. 7, an exemplary methodology 700 is illustrated. The methodology 700 starts at 702, and 704 tabular data loaded into a computer-executable application is received. At 706, types are assigned to column and/or row labels based upon content of the entries in their respective columns and/or rows. For instance, the types can identify whether the columns and/or rows include entities, as well as types of such entities. This can further be used to identify attributes that are commonly associated with such types. At 708, a language model in an ASR system for the application is updated based upon the content of the tabular data and the types assigned at 706. The methodology 700 completes at 710.

Figure 8:
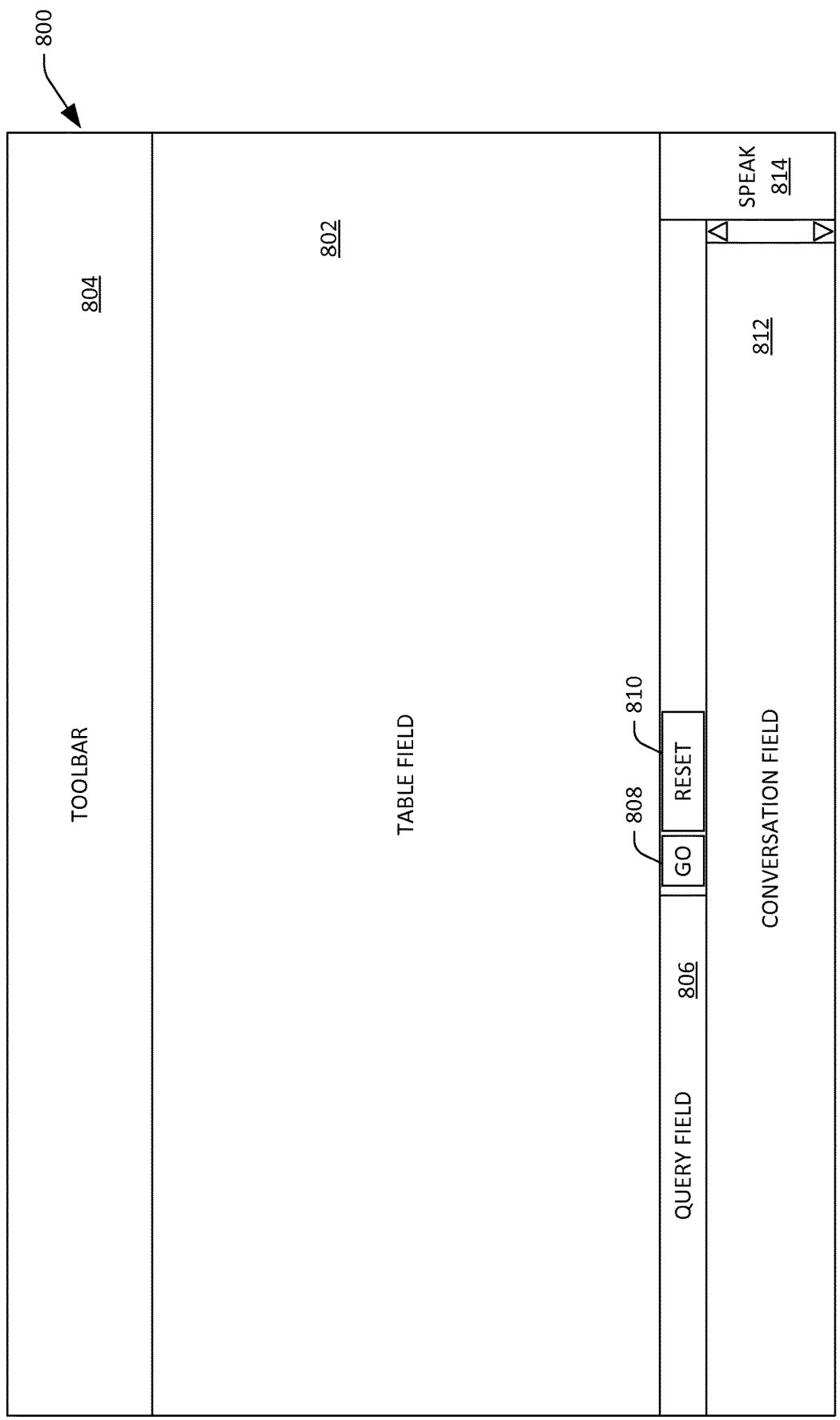

Now referring to FIG. 8, an exemplary graphical user interface 800 corresponding to a spreadsheet application is illustrated. The graphical user interface 800 includes a table field 802 that can display the tabular data 114 (e.g., a spreadsheet). Generally, the table field 802 can include a plurality of cells, wherein values of such cells can be defined values or based upon values in the spreadsheet or other spreadsheets. The graphical user interface 800 further can include a toolbar 804 that includes buttons, pulldowns, menus, tabs, and/or the like that can be selected by the user to perform functionality supported by the spreadsheet application.

The graphical user interface 800 can optionally include a query field 806 that can receive textual queries from the user. For instance, the user can position a cursor in the query field 806 and can set forth a natural language query in the query field 806. A button 808 can be selected by the user, which can cause a query provided in the query field 806 to be transmitted to the search system 130 and/or the table manipulation system 124. A reset button 810, when selected by the user, can reset content shown in the table field 802 to a previous state.

The graphical user interface 800 may also include a conversation field 812 that presents auditable logs of interaction between the user of the spreadsheet application and, for instance, the executor system 120 and/or the search system 130. The conversation field 812 can detect natural language queries set forth by the user and can further depict actions performed by the executor system 120 responsive to receipt of the natural language queries.

The graphical user interface 800 may also include a button 814 that, when selected by the user, indicates to a computing device and/or the spreadsheet application that the user desires to set forth a spoken utterance that includes a reference to an operation to be performed relative to the tabular data 114. For instance, the user can select the button 814 by left-clicking and holding while hovering a cursor over the button 814. In another example, if the graphical user interface 800 is shown on a touch-sensitive display, the user can press (and hold) her finger on the button 814 to indicate when the user is to begin and cease setting forth voice input. In another example, the ASR system 122 can listen in the background for a particular voice command, and begin decoding a voice signal responsive to detecting the voice command.

Figure 9:
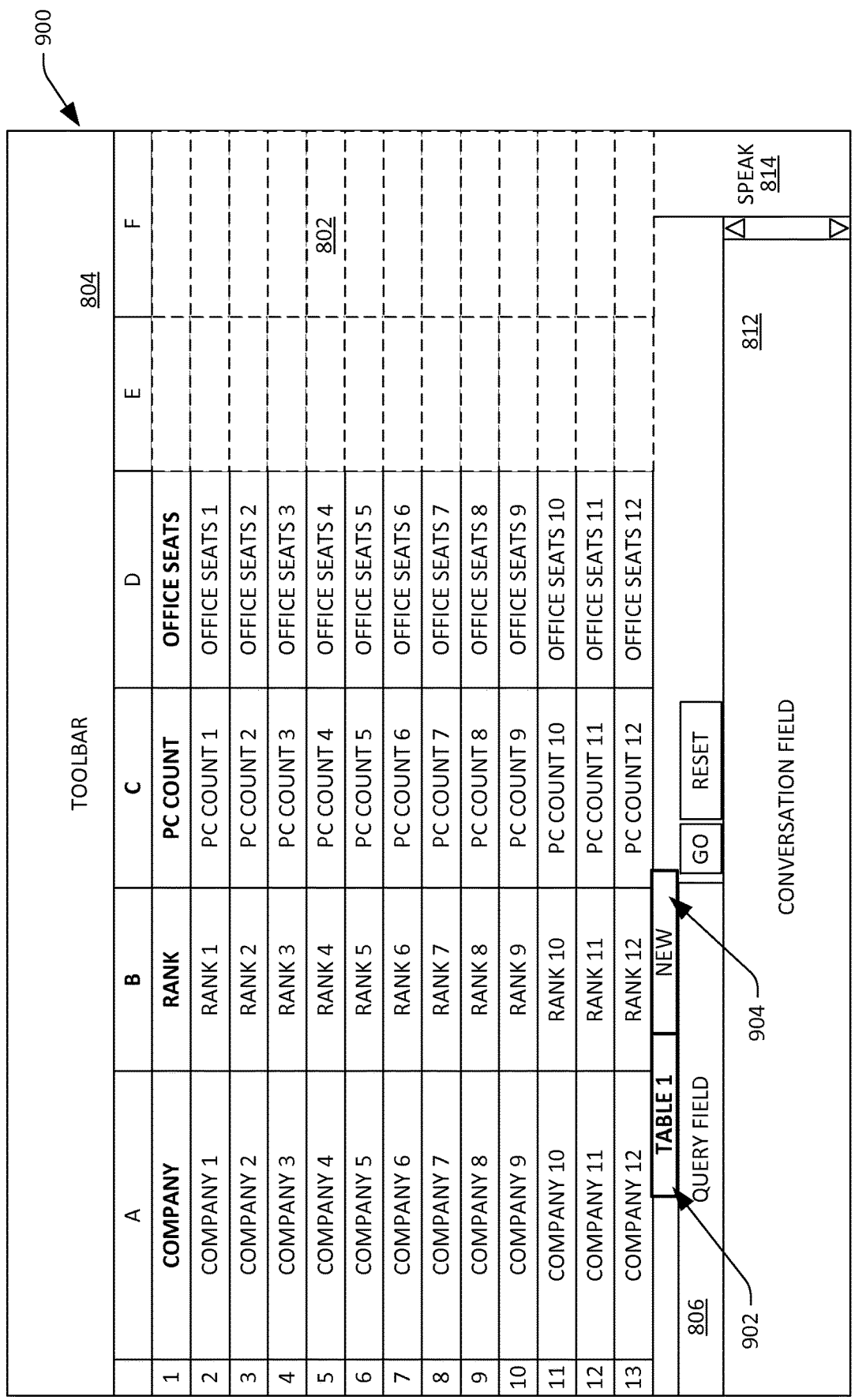

Now referring to FIG. 9, an exemplary graphical user interface 900 is illustrated. The graphical user interface 900 depicts a particular table shown in the table field 802 that includes columns with column headers "COMPANY", "RANK", "PC COUNT", and "OFFICE SEATS". Thus, the spreadsheet application has such table loaded therein. A tab 902 indicates that "TABLE 1" is currently being shown in the graphical user interface 900. A tab 904, if selected by the user, can cause a new (empty) worksheet to be presented.

Turning now to FIG. 10, another exemplary graphical user interface 1000 is illustrated. In the graphical user interface 1000, the conversation field 812 comprises a conversation bubble 1002 that depicts a natural language query set forth by the user. In this case, such natural language query is "how many employees does each company have?" Responsive to receiving such query, the search system 130 can retrieve tabular data from an external source that identifies employees corresponding to the companies listed in the "COMPANY" column of the table shown in the table field 802. A conversation bubble 1004 informs the user of the action performed by the search system 130 and/or the table manipulation system 124—e.g., that data was imported from a particular source (SOURCE 1). Accordingly, through a natural language (e.g. spoken) query, the table shown in the table field 802 has been updated to include a column with a header "EMPLOYEES" and values corresponding thereto, wherein the values depict a number of employees for respective companies listed in the "COMPANY" column.

With reference now to FIG. 11, another exemplary graphical user interface 1100 is depicted. In such graphical user interface, the user has set forth the natural language query "show me companies that have 25% more employees than office seats". This is shown in the conversation field 812 in a conversation bubble 1102.

Turning now to FIG. 12, another exemplary graphical user interface 1200 is illustrated. In this exemplary graphical user interface 1200, the executor system 120 causes a new table (TABLE 2) to be presented to the user based upon the natural language query "show me companies that have 25% more employees than office seats" set forth by the user. Specifically, the table manipulation system 124 generates a program based upon the natural language query set forth by the user, wherein operations performed when the program is executed are depicted in the conversation field 812. For instance, as shown in conversation bubble 1202, a filter is set such that the number of employees is greater than the number of office seats multiplied by 1.25. Further, conversation bubble 1204 informs the user that a new table has been displayed. The new table (TABLE 2) includes companies that have 25% more employees than office seats (e.g., TABLE 2 is a filtered version of TABLE 1).

The user may then wish to change the course of the querying. With reference to FIG. 13, another graphical user interface 1300 is depicted, where it is illustrated that the user has set forth the query "show me the industries that are most profitable" as shown in the conversation bubble 1302 of the conversation field 812. Such query may be a DFD query, in that the search system 130 considers contents of TABLE 1 and TABLE 2 when searching the index 134 for tabular data. The search system 130 can receive the natural language query, access an external data source and generate a new table (TABLE 3) that includes two columns; a first column with a column header of "INDUSTRY" and a second column with a column header of "PROFIT".

Now referring to FIG. 14, an exemplary graphical user interface 1400 is illustrated. The conversation field 812 in the graphical user interface 1400 depicts actions undertaken by the search system 130 and/or the table manipulation system 124 responsive to receipt of the query shown in the conversation bubble 1302. For instance, the search system 130 may have retrieved information pertaining to profit corresponding to the companies listed in TABLE 1 from a listed source (SOURCE 2). Such action is shown in a conversation bubble 1402. As noted above, the query may be a DFD query, such that the query is set forth in the context of TABLE 1. Thus, profit corresponding to each company listed in TABLE 1 can be obtained. Thereafter, profit values retrieved from SOURCE 2 can be summed. The conversation field 812 includes a conversation bubble 1404 that informs the user of the summing action undertaken when generating TABLE 3, shown in the table field 802. With reference now to FIG. 15, an exemplary graphical user interface 1500 is illustrated, wherein the conversation field 812 includes a conversation bubble 1502 that informs the user that TABLE 3 was generated by sorting the implicit entities "INDUSTRY" by the attribute PROFIT.

Figure 16:
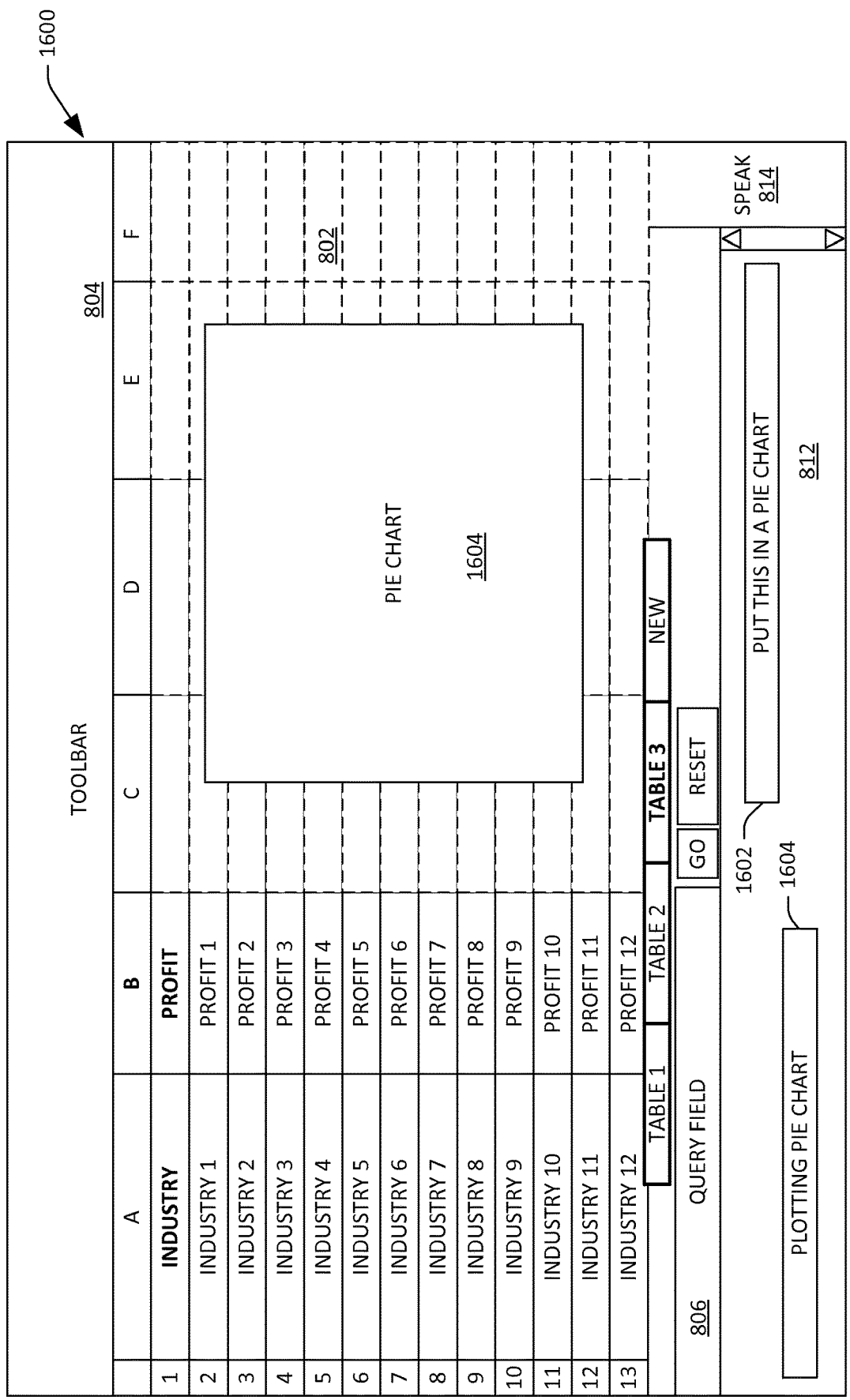

Now referring to FIG. 16, yet another exemplary graphical user interface 1600 is illustrated. In the graphical user interface 1600, the table manipulation system 124 has received the query "put this in a pie chart", as evidenced by a conversation bubble 1602 in the conversation field 812. Responsive to receiving such natural language query, the table manipulation system 124 can cause a pie chart 1604 that is representative of data in TABLE 3 (shown in the table field 802) to be presented to the user. A conversation bubble 1604 indicates to the user that the pie chart 1604 was generated.

Figure 17:
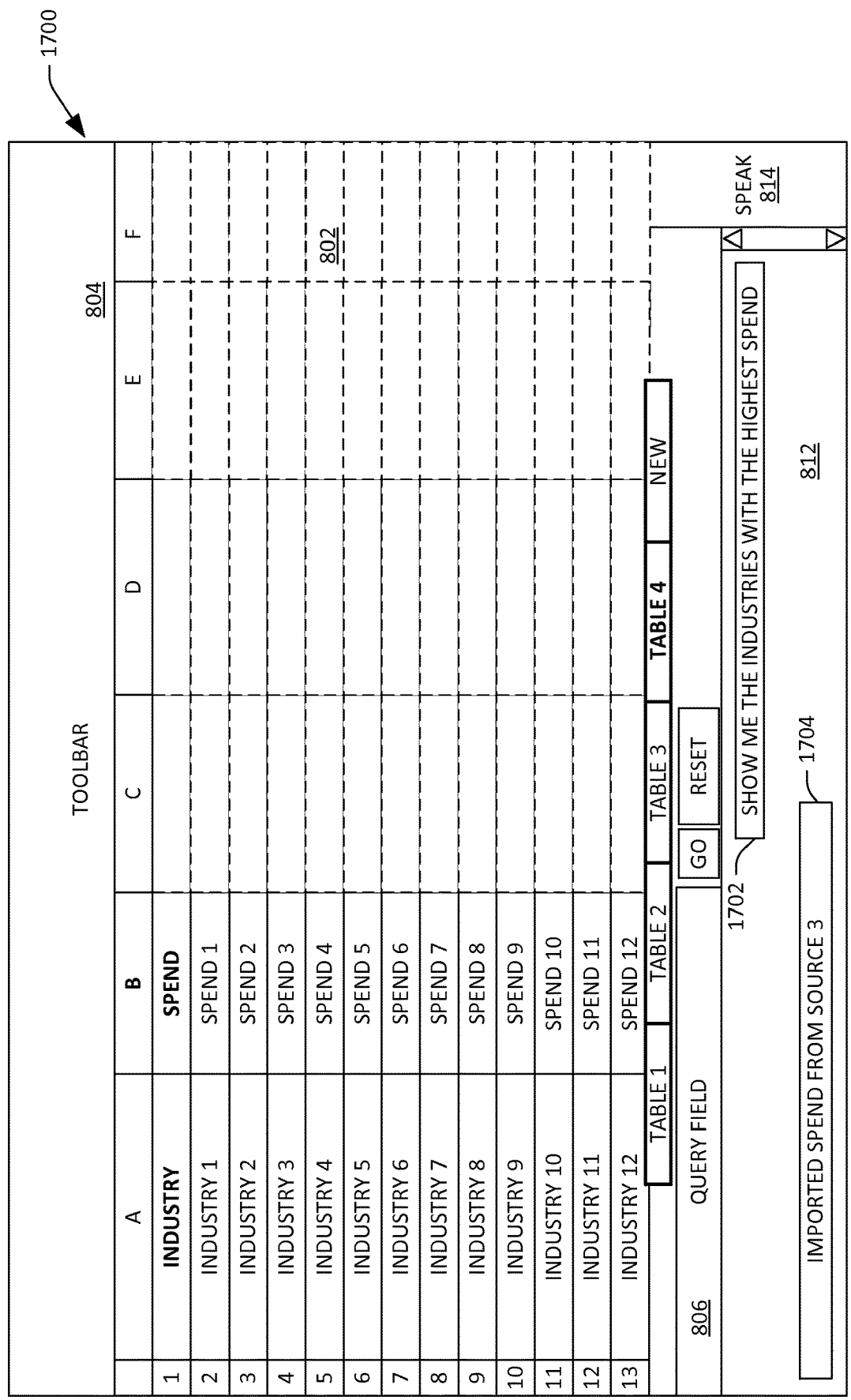

Now referring to FIG. 17, yet another exemplary graphical user interface 1700 is illustrated. The conversation field 812 includes a conversation bubble 1702 that indicates that the user has set forth the natural language query "show me the industries with the highest spend." Responsive to receiving such natural language query, the search system 130 can access the index 134 and retrieve a snippet of a table that can be used to respond to the query. A conversation bubble 1704 indicates to the user that the search system 130 retrieved data in a "SPEND" column from "SOURCE 3". FIG. 18 depicts still yet another exemplary graphical user interface 1800, where the conversation field 812 includes conversation bubbles 1802 and 1804 that respectively describe actions undertaken by the table manipulation system 124. Specifically, the table manipulation system 124 can create a pivot table (TABLE 4), where industries represented in TABLE 3 remain in the first column, while spend corresponding to such industries is summed. Subsequently, the table manipulator component 106 can sort by values in the "SPEND" column.

Figure 19:
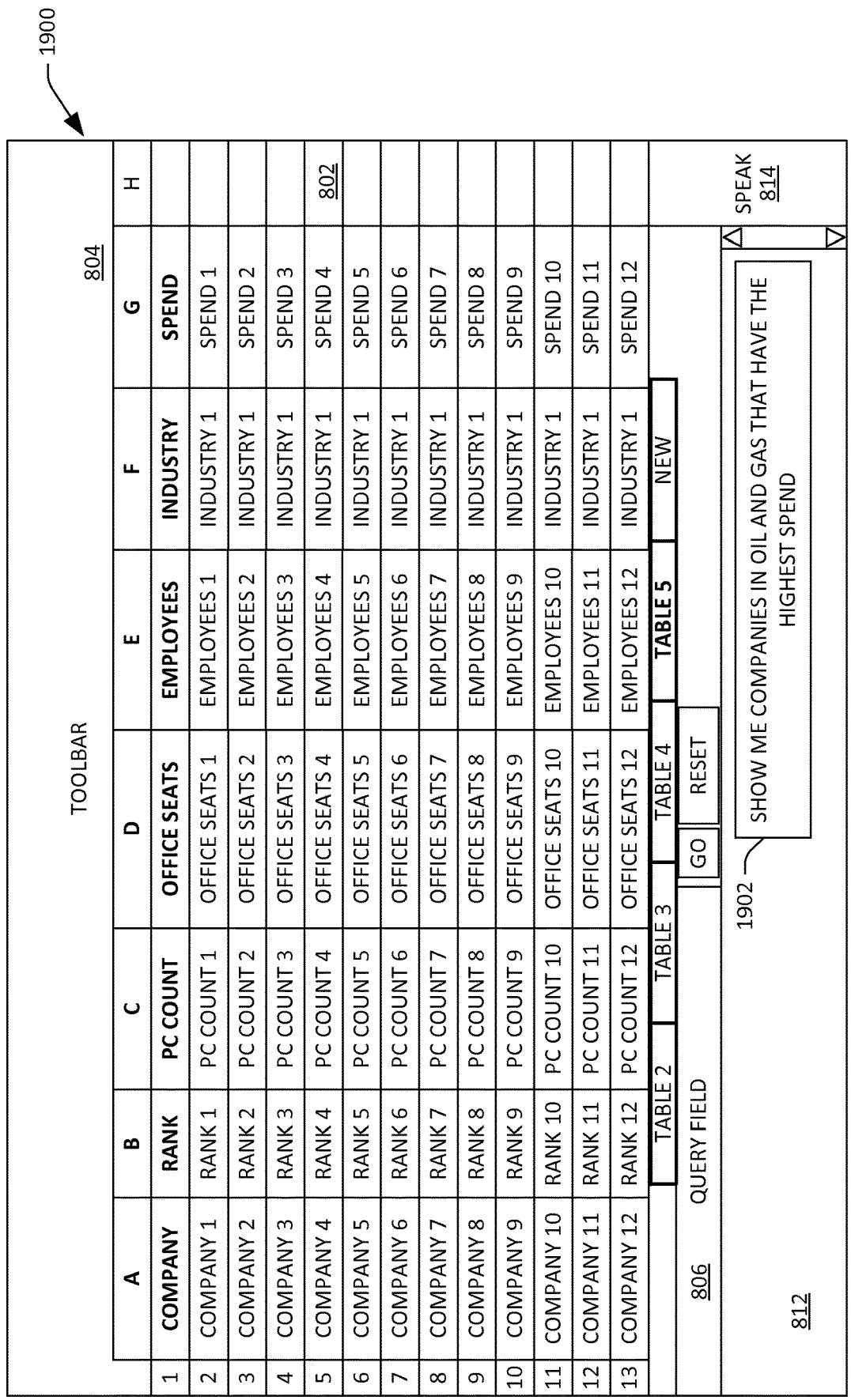

Now referring to FIG. 19, yet another exemplary graphical user interface 1900 is illustrated. In the exemplary graphical user interface 1900, the conversation field 812 includes a conversation bubble 1902 that indicates that the user has set forth the natural language query "show me companies in oil and gas that have the highest spend". Now referring to FIG. 20, an exemplary graphical user interface 2000 depicting actions undertaken by the search system 130 and/or the table manipulation system 124 responsive to receipt of the natural language query shown in the conversation bubble 1902 is illustrated. Specifically, the table manipulator component 106 sets a filter, wherein the "INDUSTRY" column is filtered by the value "Oil, Gas, & Mining", as shown in conversation bubble 2002. Thereafter, the table manipulator component 106 causes a new table to be presented (TABLE 5), wherein such action is illustrated in a conversation bubble 2004 in the conversation field 812. Subsequently, the table manipulation system 124 sorts the table by values in the SPEND column, as illustrated in a conversation bubble 2006. Accordingly, the table shown in the table field 802 has multiple columns: "COMPANY", "RANK", "PC COUNT", "OFFICE SEATS", "EMPLOYEES", "INDUSTRY", and "SPEND", wherein each company shown in TABLE 5 has a value of the INDUSTRY attribute being Oil, Gas, & Mining, where the companies are arranged based upon values of the SPEND attribute.

Figure 21:
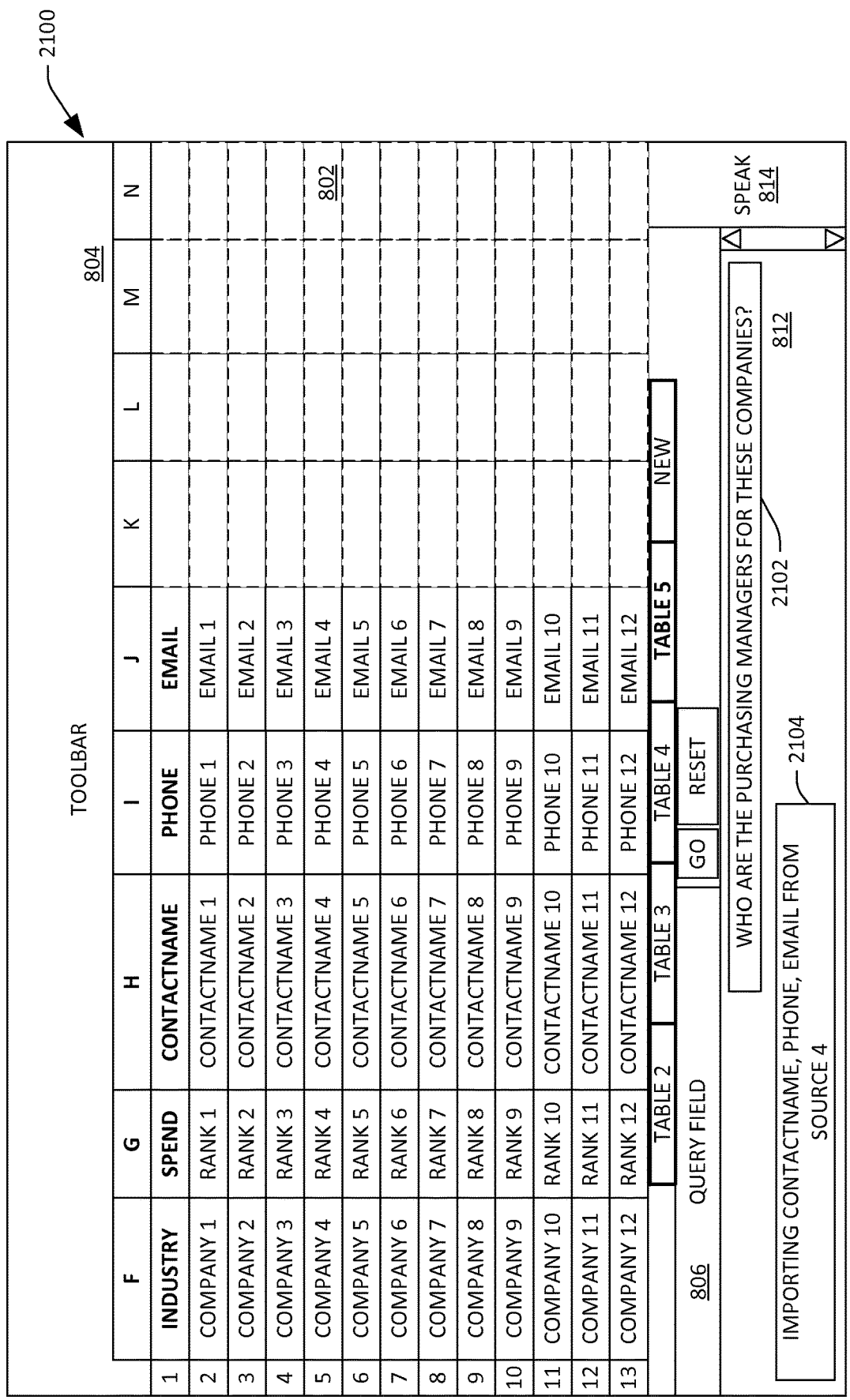

With reference now to FIG. 21, yet another exemplary graphical user interface 2100 is depicted. The user sets forth the query "who are the purchasing managers for these companies", as depicted in a conversation bubble 2102, wherein the query is made with reference to TABLE 5. Accordingly, such query is a DFD query. Responsive to receiving the query, the search system 130 can retrieve contact information (e.g., multiple attributes) and cause such contact information to be appended to the tabular data in TABLE 5. As depicted in conversation bubble 2104 of the conversation field 812, values for CONTACTNAME, PHONE and EMAIL for each company represented in TABLE 5 have been retrieved from a particular source (SOURCE 4).

Figure 22:
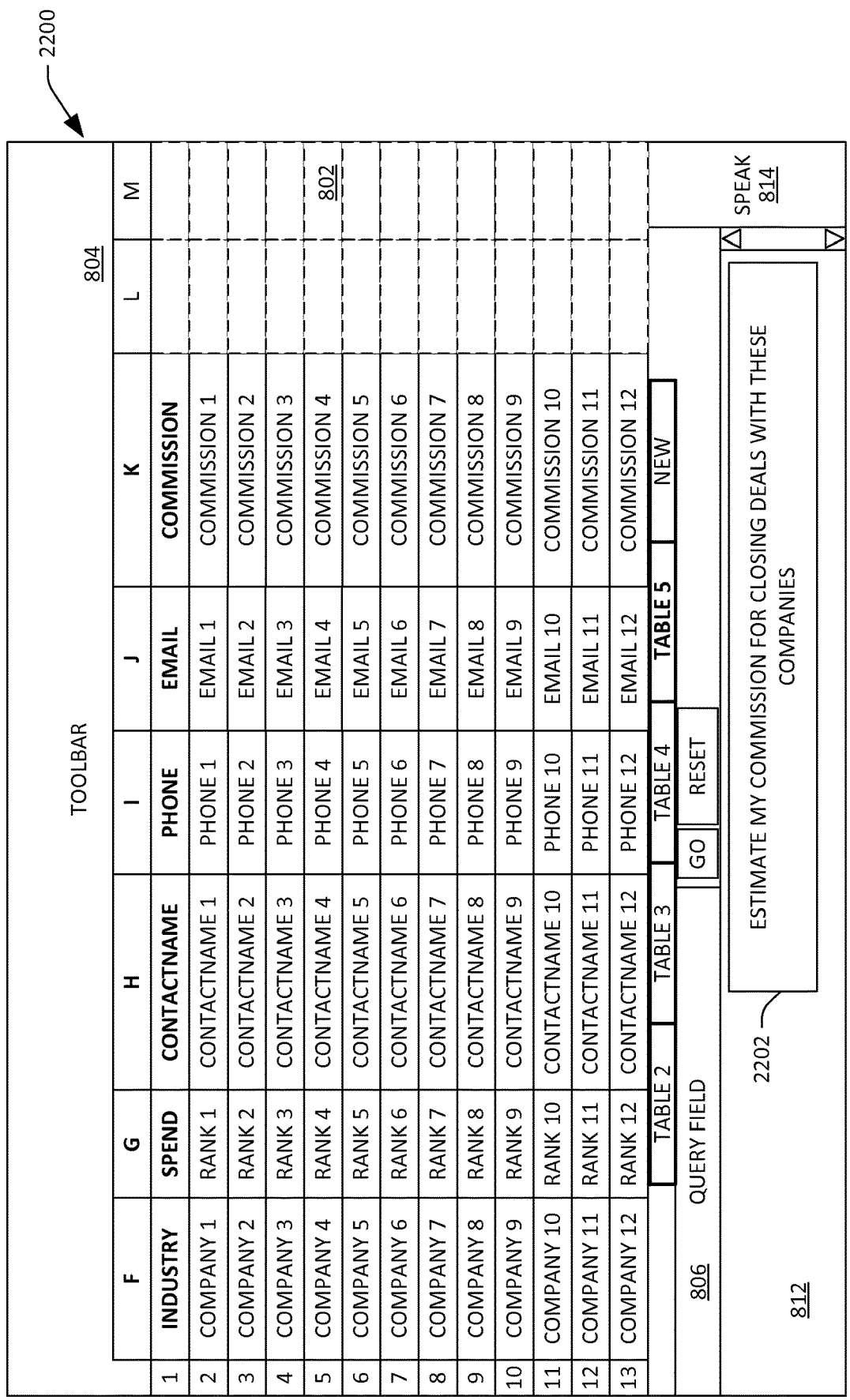

Now referring to FIG. 22, another exemplary graphical user interface 2200 is illustrated, wherein the user is viewing TABLE 5 and sets forth the natural language query "estimate my commission for closing deals with these companies", as depicted in a conversation bubble 2202 in the conversation field 812.

Turning to FIG. 23, another exemplary graphical user interface 2300 is depicted. The conversation field 812 indicates that "COMISSION" was imported from a fifth source (e.g., as shown in conversation bubble 2302). It can be understood that such value may not be directly included in a data source, but instead may be computed by way of a certain function. In the example shown in FIG. 23, a function for computing commission can be imported from an external data source (e.g., a web service) and executed over values in the spreadsheet and/or values retrieved by way of searching over the index 134. FIG. 23 is set forth to indicate that the executor system 120 can be configured not only to retrieve tabular data, but also to retrieve functions that can be executed over tabular data.

From the examples set forth herein, it can be ascertained that the conversation field 812 presents an auditable log to the user, such that the user can view how her natural language queries were interpreted and actions undertaken by the executor system 120 responsive to receiving the natural language queries. The user can cause certain functions to be rolled back if incorrect. Furthermore, in an exemplary embodiment, the user can select a certain action performed by the executor system 120 in the conversation log, wherein selection can cause presentation (e.g., in a drop-down or pulldown menu) of other options that can be performed (e.g., a next most highly ranked list of functions). The user can cause the operation of the executor system 120 to rollback and be modified by selecting a desired function. In still yet another example, the user can cause a series of natural language queries and corresponding responses to be saved as a macro, particularly if the user believes that such series of queries will be repeated. This can allow the user to perform an identical sequence of actions over different sets of tabular data (e.g., different spreadsheets) or even the same spreadsheet that has some updated content.

Other exemplary mechanisms for setting forth queries to a spreadsheet application are also contemplated. For instance, as indicated above, a DFD search can be supported by the system 100, wherein a list of entities that may be in one or more columns in a spreadsheet can be provided to the system 100. In another example, the list of entities may be provided in some other manner, such as by extracting entities in an e-mail message, from a document, from a web page, etc. The user may optionally specify one or more attributes of interest that pertains to entities in the list of entities. The query, which can include the entities and (optionally) attributes, can be provided to the search system 130, which can return a ranked list of tables that are relevant to the entities (and optionally the attributes), thereby allowing the user to receive attribute values for attributes of interest. For instance, in an exemplary embodiment, the search system 130 can be accessed by way of a browser-based interface, as shown in an exemplary graphical user interface 2400 depicted in FIG. 24. The graphical user interface 2400 includes a search field 2402 that is configured to receive a natural language query, and optionally a specification of existing tabular data of interest and attributes of interest. The search system 130, responsive to receiving the query (e.g., "African countries by GDP"), can present a table 2404 that includes a list of entities (e.g., African Nations) and attributes of interest to the user. The graphical user interface 2400 can also include a hyperlink 2406 to a source for the table 2404. It is to be understood that the graphical user interface 2400 may include multiple hyperlinks if the table is constructed from multiple sources. Selection of the hyperlink 2406 can cause an entirety of the table 2404 to be presented in a popup window, for instance.

Optionally, while not shown, other attributes that may be of interest to the user 210 may be presented in the graphical user interface 2400, such as a pulldown menu that displays popular attributes, hyperlinks that represent popular attributes, etc. Further, the user can specify a list of entities from dropdowns, specifying the table, and table column or may select columns/cells and right-click or drag and drop to initiate a search and/or populate the query. The user may also specify a range of cells. The user can potentially further indicate an attribute through a more natural language interface by inputting, for instance, "group my table by region," in which case, the table manipulation system 124 and/or the search system 130 can issue an entity-attribute query using the user table entities in the search attribute region. The user may then specify a table, and the grouping operation can be performed.

Various user interface elements are supported. For instance, a query interface may be provided where a user can supply a single entity name, multiple entity names, or a concept name in a first search box, and can use a second search box to supply one or more attributes of interest that belong to entities described in the first box. The attribute string may also be a conceptual set of attribute names, such as dimensions which may include height, weight and length. For instance, in the first box, the entity "Seattle" may be provided and the second box may include the attribute "temperature".

Figure 25:
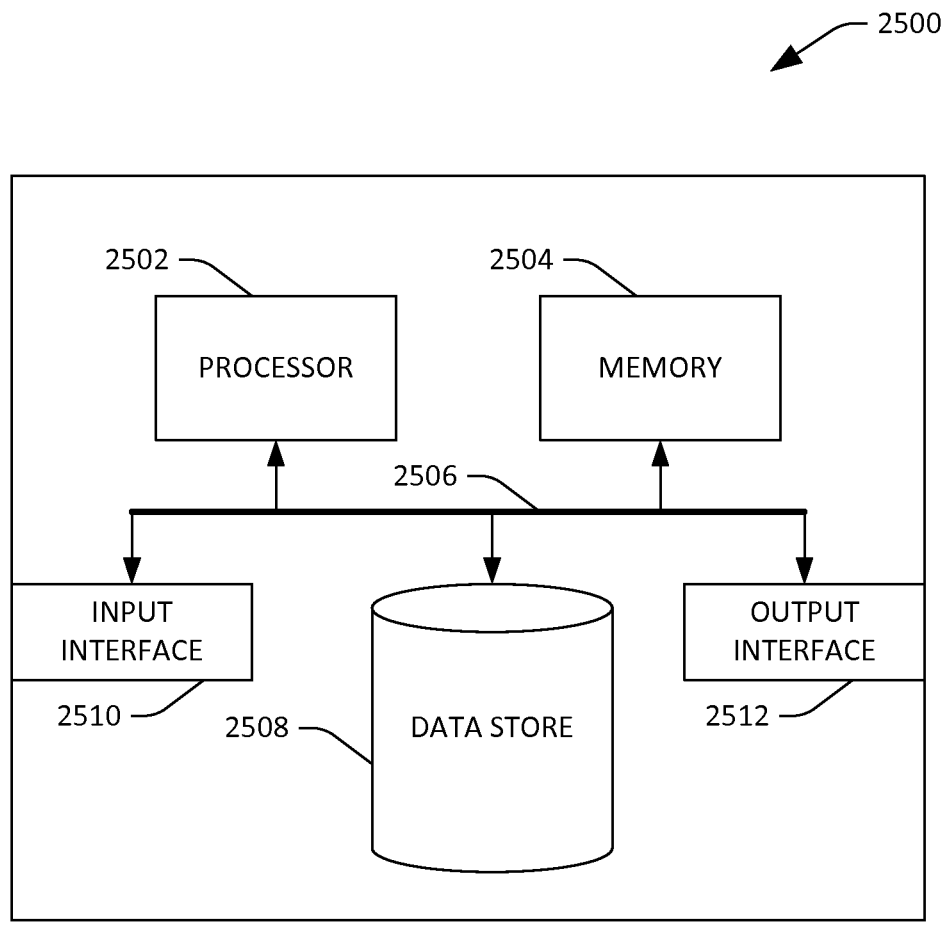
FIG. 25 is an exemplary computing system.

Referring now to FIG. 25, a high-level illustration of an exemplary computing device 2500 that can be used in accordance with the systems and methodologies disclosed herein is illustrated. For instance, the computing device 2500 may be used in a system that supports recognizing elements of a spoken utterance. By way of another example, the computing device 2500 can be used in a system that supports constructing programs based upon natural language queries. The computing device 2500 includes at least one processor 2502 that executes instructions that are stored in a memory 2504. The instructions may be, for instance, instructions for implementing functionality described as being carried out by one or more components discussed above or instructions for implementing one or more of the methods described above. The processor 2502 may access the memory 2504 by way of a system bus 2506. In addition to storing executable instructions, the memory 2504 may also store an acoustic model, a lexicon model, a language model, tabular data, a table index, etc.

The computing device 2500 additionally includes a data store 2508 that is accessible by the processor 2502 by way of the system bus 2506. The data store 2508 may include executable instructions, models used in an ASR system, tabular data, a table index, etc. The computing device 2500 also includes an input interface 2510 that allows external devices to communicate with the computing device 2500. For instance, the input interface 2510 may be used to receive instructions from an external computer device, from a user, etc. The computing device 2500 also includes an output interface 2512 that interfaces the computing device 2500 with one or more external devices. For example, the computing device 2500 may display text, images, etc. by way of the output interface 2512.

It is contemplated that the external devices that communicate with the computing device 2500 via the input interface 2510 and the output interface 2512 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 2500 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 2500 may be a distributed system. Thus, for instance, several devices may be in communication by way of a network connection and may collectively perform tasks described as being performed by the computing device 2500.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing device comprising:
    a processor; and
    memory that comprises an application that is executed by the processor,
        the application has tabular data loaded therein, the tabular data comprises
    a modifiable text string in a cell of column of the tabular data,
        wherein the processor, when executing the application in the memory, performs acts comprising:
    responsive to receiving voice input in the form of a natural language query from a user viewing the tabular data on a display,
        generating a transcription of the natural language query through use of a computer-implemented automatic speech recognition (ASR) system,
        wherein the transcription of the natural language query includes the modifiable text string in the column of the tabular data;
    constructing a program based upon the transcription of the natural language query, wherein the program, when executed by the processor, is configured to cause the processor to perform a computing operation with respect to content of a second cell in the column; and
    executing the program to perform the computing operation, wherein executing the program results in at least one of the content of the second cell in the column or content of a third cell in the tabular data to be updated based upon the transcription of the modifiable text string and presenting the updated content on the display.

2. The computing device of claim 1 being a client computing device, the client computing device being one of a tablet computing device or a mobile telephone.

3. The computing device of claim 1, the application being a spreadsheet application, the tabular data loaded into a spreadsheet of the spreadsheet application.

4. The computing device of claim 1, wherein the ASR system comprises an acoustic model that models phones in a language of the voice input, a lexicon model that defines probabilities over elements that include respective sequences of phones, and a language model that defines probabilities over sequences of elements, the acts further comprising:
    updating the language model to include the modifiable text string or a synonym of the modifiable text string responsive to the modifiable text string being loaded into the application.

5. The computing device of claim 1, the acts further comprising customizing the ASR system to constrain potential interpretations of the voice input.

6. The computing device of claim 1, the computing operation being one of a sort of the tabular data, a filter of the tabular data, a mathematical operation performed over entries in the tabular data, a visualization of the tabular data, or an augmentation of the tabular data.

7. The computing device of claim 6, the computing operation is the augmentation of the tabular data, the acts further comprising:
    executing a search over a network accessible index of tables based upon the query; and
    augmenting the tabular data loaded into the application with additional tabular data included in the index of tables.

8. A method performed by a processor of a computing device, the method comprising:
    receiving tabular data that has been loaded into a computer-executable application and is being presented on a display;
    generating, by way of a computer-implemented automatic speech recognition (ASR) system, a transcription of a natural language query included in a voice signal set forth by a user of the computer-executable application, the transcription of the natural language query includes text entered by a user into a cell of a column of the tabular data, the natural language query is indicative of an operation to be performed with respect to a first value in a second cell in the tabular data, the first value being presented on the display;
    constructing a computer-executable program based upon the transcription of the natural language query, wherein the computer-executable program, when executed by the processor of the computing device, is configured to cause the processor to perform the operation; and
    executing the computer-executable program, wherein executing the computer-executable program causes the first value in the second cell to be replaced by a second value in the second cell such that the second value is presented on the display.

9. The method of claim 8, wherein the second value is retrievable from a data source that is accessible to the computing device by way of a network, wherein executing the operation comprises:
    augmenting the tabular data with the second value retrieved from the data source; and
    performing a subsequent operation over the tabular data and the second value based upon the query.

10. The method of claim 8, the computer-executable application being a web browser.

11. The method of claim 8, the method further comprising:
    responsive to receiving the tabular data, updating a language model of an automatic the ASR system, wherein updating the language model comprises including the modifiable text in the language model.

12. The method of claim 11, the text being one of a column header or a row header.

13. The method of claim 11, the language model comprises a partially completed phrase that is representative of historically observed commands, wherein updating the language model further comprises including the text in the language model to complete the partially completed phrase.

14. The method of claim 13, wherein updating the language model further comprises:

assigning a type to the text based upon the tabular data, the type indicating that the text is representative of one of people, places, or things in the tabular data; and assigning a probability value to the completed phrase based upon the type assigned to the text.

15. The method of claim 8, further comprising:

prior to generating the transcription of the natural language query:

receiving an indication that a graphical button has been selected; and monitoring output of a microphone responsive to receiving the indication.

16. The method of claim 8, wherein executing the computer-executable program causes updated tabular data to be generated, the method further comprising:

subsequent to executing the computer-executable program, generating, by the ASR system, a second transcription of a second a second natural language query included in a second voice signal; and performing a second operation relative to the updated tabular data, the second operation performed based upon the natural language query and the second natural language query.

17. A computer-readable storage medium comprising instructions that, when executed by a processor, cause the processor to perform acts comprising:

receiving tabular data loaded into a spreadsheet application, the tabular data comprises an entry, the entry comprises text input into the tabular data by a user;

generating, by a computer-implemented automatic speech recognition (ASR) system, a transcription of a spoken natural language query set forth by a user with respect to the tabular data, the spoken natural language query capture by a microphone and the transcription generated based upon the microphone capturing the spoken natural language query, the transcription includes the text included in the tabular data;

identifying that the transcription includes the text;

based upon identifying that the transcription includes the text input into the tabular data by the user, constructing a program, wherein the program, when executed by the processor is configured to cause the processor to perform an operation with respect to a second entry in the tabular data; and executing the program to perform the operation, wherein executing the program causes at least one of the second entry or a third entry to be updated in the tabular data, and further wherein the at least one of the second entry or the third entry is presented on a display.

18. The computer-readable storage medium of claim 17, wherein executing the program comprises augmenting the tabular data with additional tabular data retrieved from online tabular data.

19. The computer-readable storage medium of claim 18, wherein executing the program further comprises executing a search over a network accessible index of tables based upon the natural language query, wherein the tabular data is augmented with the additional tabular data based upon the search.

20. The computer-readable storage medium of claim 17, wherein the ASR system comprises a language model that, prior to the tabular data being received, fails to include the text, the acts further comprising:

in response to receiving the tabular data, updating the language model to include the text input into the tabular data by the user.

* * * * *